(12) United States Patent
Mugiraneza et al.

(10) Patent No.: US 11,086,464 B2
(45) Date of Patent: Aug. 10, 2021

(54) DISPLAY DEVICE WITH TOUCH PANEL PROVIDING TOUCHED POSITION DETECTION AND PRESSING FORCE DETECTION

(71) Applicant: Sharp Kabushiki Kaisha, Sakai (JP)

(72) Inventors: Jean Mugiraneza, Sakai (JP); Takenori Maruyama, Sakai (JP); Yasuhiro Sugita, Sakai (JP); Kazutoshi Kida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 98 days.

(21) Appl. No.: 16/493,342

(22) PCT Filed: Mar. 22, 2018

(86) PCT No.: PCT/JP2018/011301
§ 371 (c)(1),
(2) Date: Sep. 12, 2019

(87) PCT Pub. No.: WO2018/180845
PCT Pub. Date: Oct. 4, 2018

(65) Prior Publication Data
US 2021/0141488 A1    May 13, 2021

(30) Foreign Application Priority Data

Mar. 29, 2017   (JP) .............................. JP2017-065358

(51) Int. Cl.
*G06F 3/044* (2006.01)

(52) U.S. Cl.
CPC .......... *G06F 3/0446* (2019.05); *G06F 3/0448* (2019.05); *G06F 3/0445* (2019.05); *G06F 2203/04105* (2013.01)

(58) Field of Classification Search
CPC .............................. G06F 3/0445; G06F 3/0446
See application file for complete search history.

(56) References Cited

U.S. PATENT DOCUMENTS

| | | | |
|---|---|---|---|
| 9,501,195 B1* | 11/2016 | Kim | ...................... G06F 3/0445 |
| 2015/0049064 A1* | 2/2015 | Shin | ........................ G06F 3/044 |
| | | | 345/178 |
| 2015/0116641 A1* | 4/2015 | Oh | .................... G02F 1/133707 |
| | | | 349/106 |

(Continued)

FOREIGN PATENT DOCUMENTS

| | | |
|---|---|---|
| JP | 2014-186711 A | 10/2014 |
| JP | 5871111 B1 | 3/2016 |

(Continued)

OTHER PUBLICATIONS

Official Communication issued in International Patent Application No. PCT/JP2018/011301, dated May 15, 2018.

*Primary Examiner* — Chun-Nan Lin
(74) *Attorney, Agent, or Firm* — Keating & Bennett, LLP

(57) ABSTRACT

To enable both touched position detection and pressing force detection without increasing the thickness of a touch panel. A driving electrode (23) is formed on the top face of a piezoelectric polymer layer (22). A touch detection electrode (24) and a pressing force detection electrode (25) are formed on the bottom face of the piezoelectric polymer layer (22).

5 Claims, 20 Drawing Sheets

(56) References Cited

U.S. PATENT DOCUMENTS

| | | | | |
|---|---|---|---|---|
| 2015/0355771 | A1* | 12/2015 | Watazu | G06F 3/0445 |
| | | | | 345/174 |
| 2016/0035290 | A1* | 2/2016 | Kim | G06F 3/0412 |
| | | | | 345/174 |
| 2016/0062505 | A1* | 3/2016 | Hwang | G06F 3/0445 |
| | | | | 345/174 |
| 2016/0357331 | A1* | 12/2016 | Kano | G06F 3/0416 |
| 2016/0370899 | A1* | 12/2016 | Chang | G06F 3/04142 |
| 2018/0260051 | A1* | 9/2018 | Kim | G06F 3/0445 |
| 2019/0339817 | A1* | 11/2019 | Kim | G06F 3/0412 |
| 2020/0057507 | A1* | 2/2020 | Park | G06F 3/04142 |

FOREIGN PATENT DOCUMENTS

| | | |
|---|---|---|
| JP | 2016-045941 A | 4/2016 |
| JP | 2017-010384 A | 1/2017 |

* cited by examiner

DISPLAY DEVICE WITH TOUCH PANEL PROVIDING TOUCHED POSITION DETECTION AND PRESSING FORCE DETECTION

TECHNICAL FIELD

The present invention relates to a touch panel and a display device.

BACKGROUND ART

An exemplary touch panel capable of concurrently detecting a touched position and pressing force is disclosed in PTL 1.

CITATION LIST

Patent Literature

PTL 1: Japanese Patent Application No. 5871111

SUMMARY OF INVENTION

Technical Problem

In the touch panel in PTL 1, a depression sensor electrode is provided on a layer different from the layers of first and second touch panel electrodes. Accordingly, it is necessary for the touch panel in the PTL 1 to include a dedicated film portion in which the depression sensor electrode is to be provided and an adhesive layer for connecting the dedicated film portion to a touch panel portion. As a result, the touch panel in PTL 1 has a problem in that the thickness of the touch panel is increased.

The present invention is completed to resolve the above problem. It is an object of the present invention to realize a touch panel capable of performing both touched position detection and pressing force detection without increasing the thickness of the touch panel and a display device including the touch panel.

Solution to Problem

In order to resolve the above problem, a touch panel according to an aspect of the present invention is characterized by including a piezoelectric polymer layer, a driving electrode formed on a first main surface of the piezoelectric polymer layer, a pressing force detection electrode formed on a second main surface of the piezoelectric polymer layer, and a touch detection electrode formed on the first main surface or the second main surface of the piezoelectric polymer layer.

Advantageous Effects of Invention

According an aspect of the present invention, an advantage is achieved in which both touched position detection and pressing force detection are enabled without increasing the thickness of the touch panel.

DESCRIPTION OF EMBODIMENTS

First Embodiment

A first embodiment according to the present invention will herein be described with reference to FIG. 1 to FIG. 5.

Figure 1:
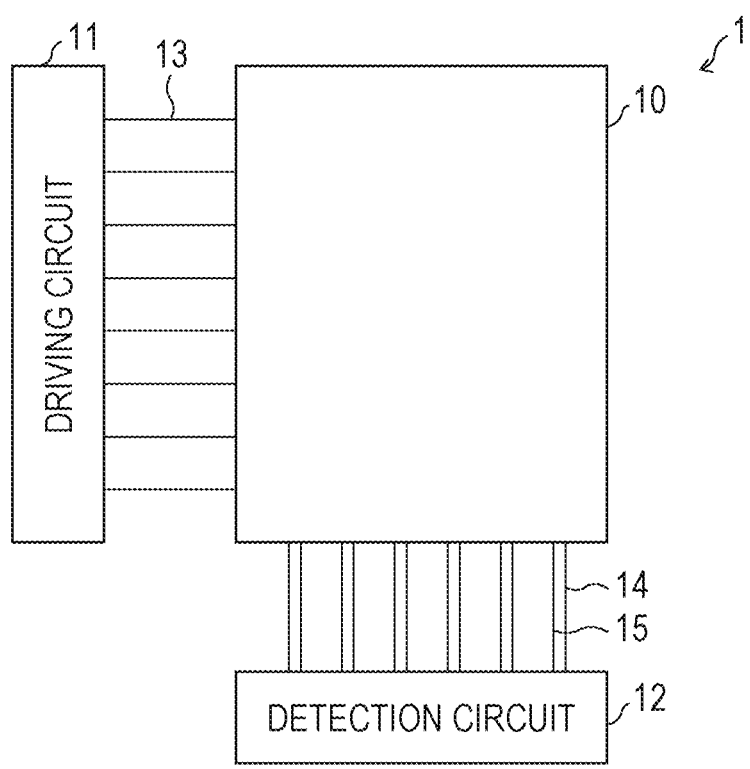
FIG. 1 is a block diagram illustrating the entire configuration of a touch panel according to a first embodiment of the present invention.

FIG. 1 is a block diagram illustrating the entire configuration of a touch panel 1 according to the first embodiment of the present invention. As illustrated in this drawing, the touch panel 1 includes a driving circuit 11, a detection circuit 12, drive lines 13, reception lines 14, and reception lines 15. The touch panel 1 has a function to detect contact with a pointing member, such as a finger or a stylus pen. The touch panel 1 is capable of concurrently detecting a touched position and pressure of depression applied to the touched position (pressing force).

Figure 2:
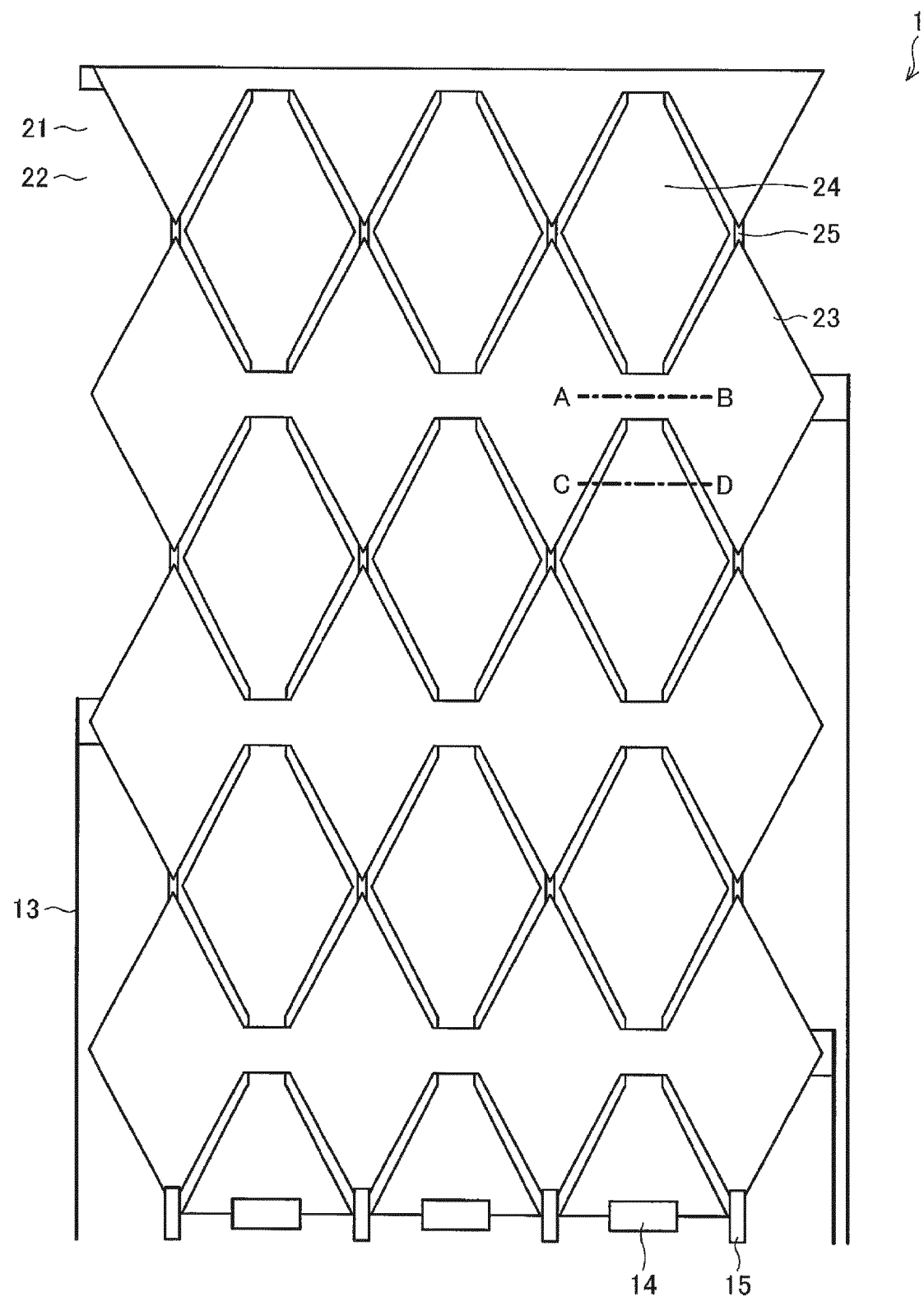
FIG. 2 is a plan view illustrating the internal configuration of the touch panel according to the first embodiment of the present invention.

FIG. 2 is a plan view illustrating the internal configuration of the touch panel 1 according to the first embodiment of the present invention. As illustrated in this drawing, the touch panel 1 further includes a transparent substrate 21, a piezoelectric polymer layer 22, driving electrodes 23, touch detection electrodes 24, and pressing force detection electrodes 25, in addition to the respective members illustrated in FIG. 1.

The transparent substrate 21 is a thin transparent substrate made of a material having optical transparency. The piezoelectric polymer layer 22 is made of a polymer material having a piezoelectric effect. Multiple piezoelectric materials are contained in the piezoelectric polymer layer 22. The piezoelectric materials are preferably copolymer materials having the piezoelectric effect.

All of the driving electrodes 23, the touch detection electrodes 24, and the pressing force detection electrodes 25 have structures in which multiple rhombus-shaped unit electrodes are joined to each other. The multiple driving electrodes 23 are orthogonal to the multiple touch detection electrodes 24 and the multiple pressing force detection electrodes 25. The multiple driving electrodes 23 extend in the lateral direction (a first in-plane direction) in the plane of the touch panel 1. The direction in which the driving electrodes 23 extend and the direction in which the touch detection electrodes 24 and the pressing force detection electrodes 25 extend may be reserve to those illustrated in FIG. 2. The multiple touch detection electrodes 24 and the multiple pressing force detection electrodes 25 extend in the longitudinal direction (a second in-plane direction) in the plane of the touch panel 1. The multiple driving electrodes 23 are connected to the driving circuit 11 via the multiple drive lines 13.

The driving circuit 11 supplies driving signals for driving the touch panel 1 to the respective multiple driving electrodes 23 via the multiple drive lines 13. Each of the multiple touch detection electrodes 24 is connected to the detection circuit 12 via any of the corresponding multiple reception lines 14. Each of the multiple pressing force detection electrodes 25 is connected to the detection circuit 12 via any of the corresponding multiple reception lines 15. The detection circuit 12 receives both touch detection signals supplied from the touch detection electrodes 24 via the reception lines 14 and pressing force detection signals supplied from the pressing force detection electrodes 25 via the reception lines 15. Accordingly, the detection circuit 12 is capable of detecting both the touched position and the pressing force. (Cross Section of Touch Panel)

Figure 3:
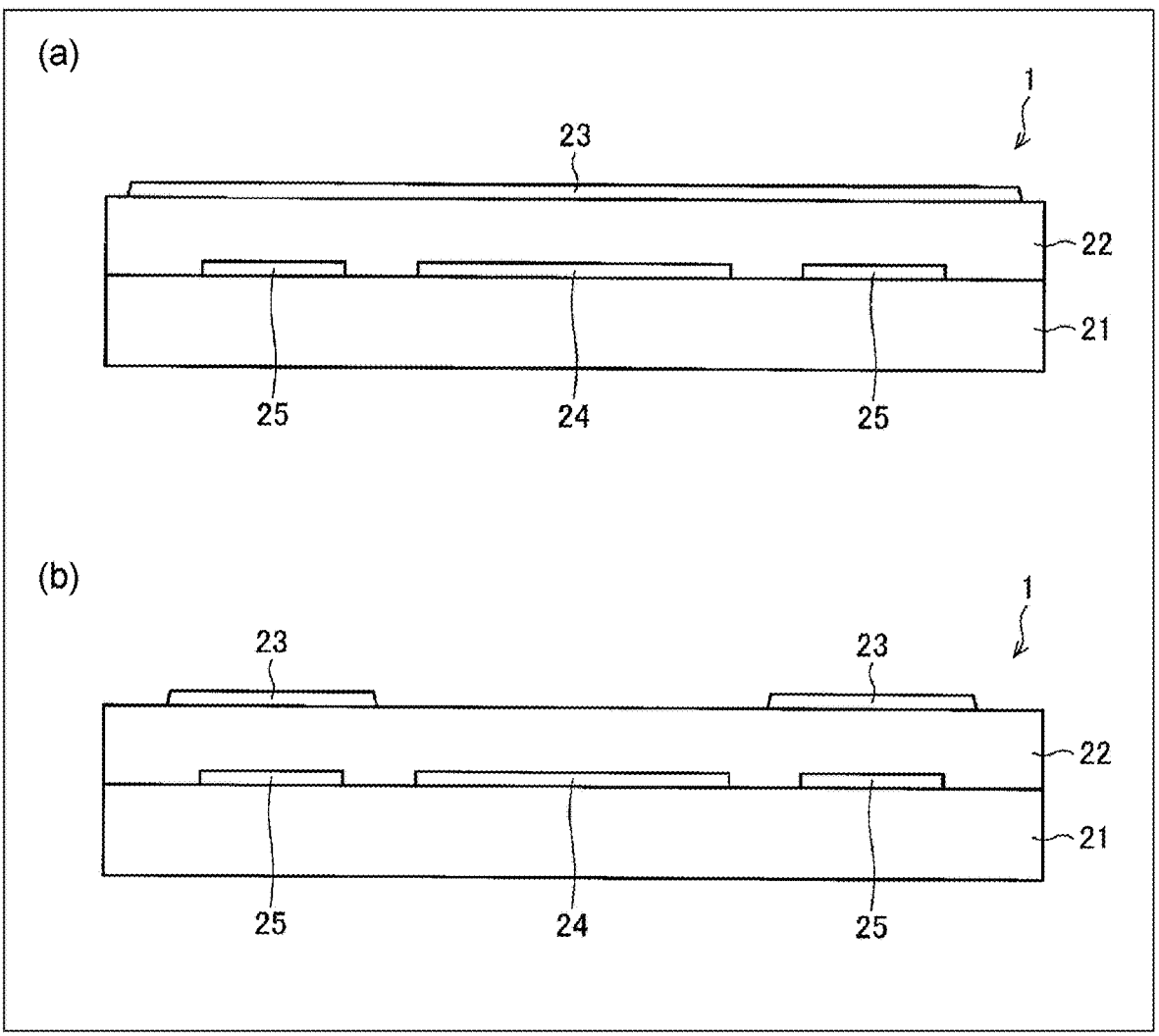
FIG. 3 includes cross-sectional views illustrating the cross-sectional structure of the touch panel according to the first embodiment of the present invention.

FIG. 3 includes cross-sectional views illustrating the cross-sectional structure of the touch panel 1 according to the first embodiment of the present invention. FIG. 3(a) illustrates a cross section taken along the A-B portion in FIG. 2 in the touch panel 1. FIG. 3(b) illustrates a cross section taken along the C-D portion in FIG. 2 in the touch panel 1.

In the touch panel 1, the piezoelectric polymer layer 22 is formed on the top face of the transparent substrate 21, as illustrated in FIG. 3(a). The driving electrode 23 is formed on the top face (a first main surface) of the piezoelectric polymer layer 22. The top face of the piezoelectric polymer layer 22 corresponds to an upper-side electrode layer (a first electrode layer) of the touch panel 1. The touch detection electrode 24 and the pressing force detection electrodes 25 are formed on the bottom face (a second main surface) of the piezoelectric polymer layer 22. The bottom face of the piezoelectric polymer layer 22 corresponds to a lower-side electrode layer (a second electrode layer) of the touch panel 1.

As illustrated in FIG. 3(b), the driving electrodes 23 and the pressing force detection electrodes 25 are arranged at positions opposed to each other. The unit electrodes of the touch detection electrodes 24 are arranged at portions that are not overlapped with the driving electrodes 23, on the bottom face of the piezoelectric polymer layer 22.
(Detection of Touch Position)

Figure 4:
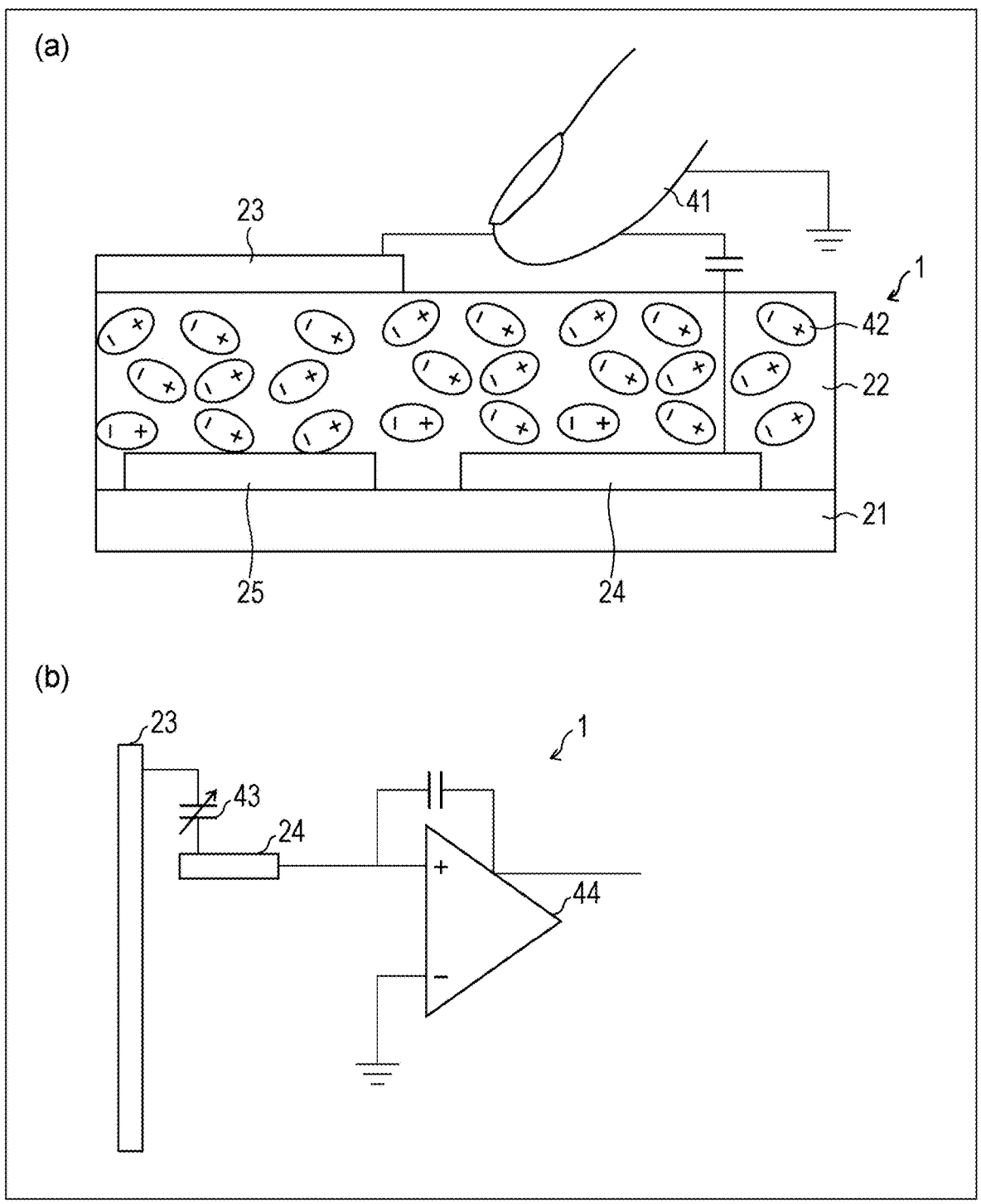
FIG. 4 includes diagrams for describing a principle of detecting a touched position by the touch panel according to the first embodiment of the present invention.

FIG. 4 includes diagrams for describing a principle of detecting the touched position by the touch panel 1 according to the first embodiment of the present invention. FIG. 4(a) illustrates depression on the touch panel 1 by a finger 41. FIG. 4(b) illustrates the configuration of an equivalent circuit for detecting the touch detection signal representing the touched position.

In the example in FIG. 4, the finger 41 of a user depresses the surface of the touch panel 1. Multiple electric dipoles 42 are formed in the piezoelectric polymer layer 22. In the first embodiment, the piezoelectric materials of the piezoelectric polymer layer 22 have d33-mode piezoelectricity. Depression by the finger 41 forms a conductive path through the driving electrode 23, the finger 41, the piezoelectric polymer layer 22, and the touch detection electrode 24. Upon depression on the touch panel 1 by the finger 41 of the user when the driving signal is supplied to the driving electrode 23, electrostatic capacitance 43 between the driving electrode 23 and the touch detection electrode 24 is varied. The touch detection electrode 24 supplies the touch detection signal based on the variation of the electrostatic capacitance 43 to the detection circuit 12 via the reception line 14. The detection circuit 12 amplifies the received touch detection signal with an operational amplifier 44 provided in the detection circuit 12. The touch panel 1 identifies an intersection between the drive line 13 through which the driving signal is supplied and the reception line through which the touch detection signal is supplied to the detection circuit 12 as the touched position in the touch panel 1.
(Detection of Pressing Force)

Figure 5:
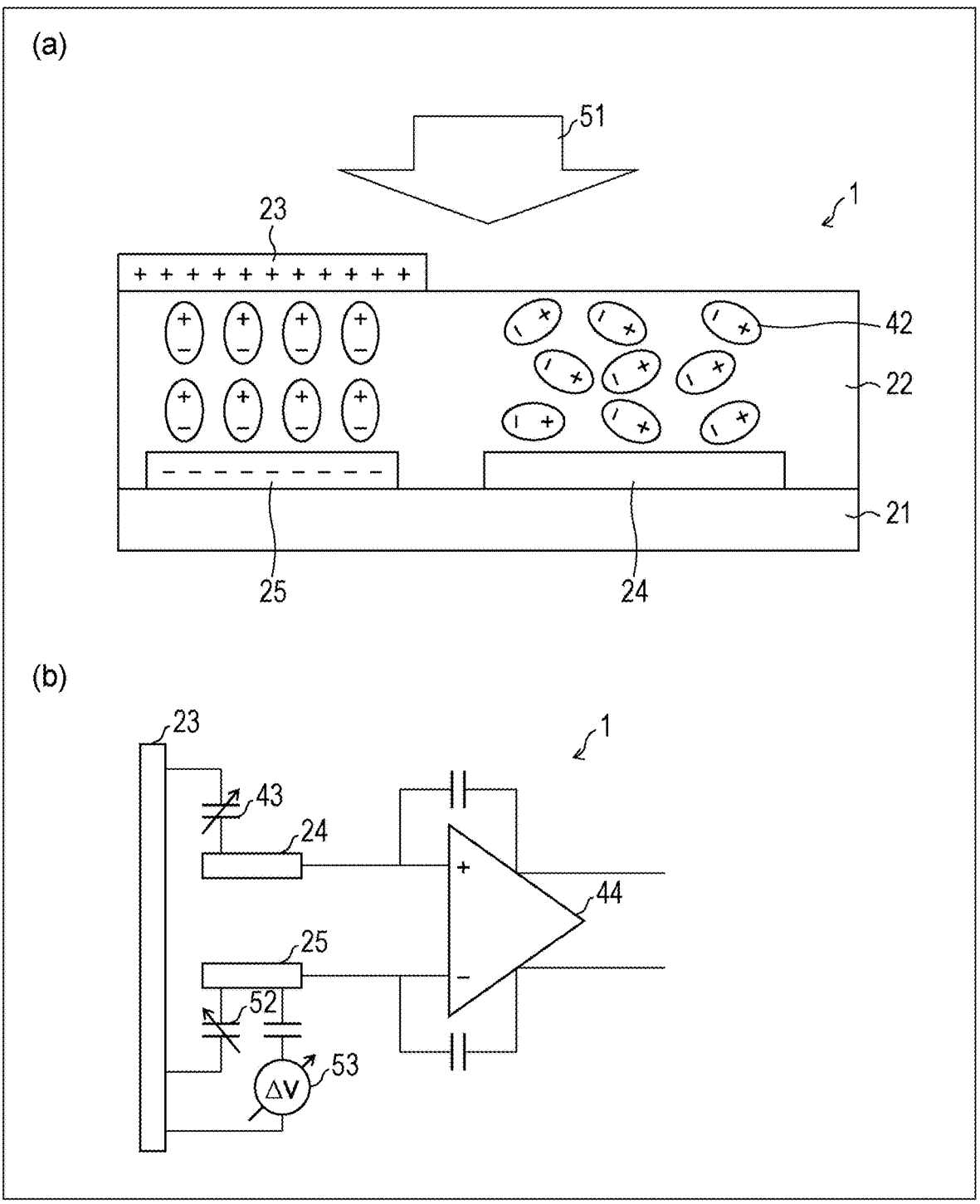
FIG. 5 includes diagrams for describing a principle of detecting pressing force by the touch panel according to the first embodiment of the present invention.

FIG. 5 includes diagrams for describing a principle of detecting the pressing force by the touch panel 1 according to the first embodiment of the present invention. FIG. 5(a) illustrates application of pressing force 51 to the touch panel by the finger 41. FIG. 5(b) illustrates the configuration of an equivalent circuit for detecting the pressing force detection signal representing the strength of the pressing force 51.

In the example in FIG. 5, the pressing force 51 is applied to the surface of the touch panel 1 by the finger 41 of the user. Electric charge occurs on the surfaces of the piezoelectric materials in the piezoelectric polymer layer 22 due to the pressing force 51. The occurrence of the electric charge varies electrostatic capacitance 52 between the driving electrode 23 and the pressing force detection electrode 25. In addition, voltage 53 induced by the pressing force 51 is generated in the piezoelectric polymer layer 22. The pressing force detection electrode 25 supplies the pressing force detection signal based on the variation of the electrostatic capacitance 43 and the occurrence of the voltage 53 to the detection circuit 12 via the reception line 15. The detection circuit 12 amplifies the received pressing force detection signal with the operational amplifier 44. The touch panel 1 calculates the strength (value) of the pressing force 51 based on the amplified pressing force detection signal.

Advantages of First Embodiment

As described above, the touch panel 1 is capable of concurrently detecting the touched position of the finger 41 of the user and the strength of the pressing force. Since the touch detection electrodes 24 and the pressing force detection electrodes 25 are formed on the same layer (the bottom face of the piezoelectric polymer layer 22) in the touch panel 1, the touch panel 1 is capable of being made thinner than ever before. The structure of the touch panel 1 of the first embodiment is simpler than those of touch panels 2 to 4 of other embodiments described below. Accordingly, the touch panel 1 of the first embodiment has superiority in the manufacturing process.

Second Embodiment

A second embodiment according to the present invention will herein be described with reference to FIG. 6 and FIG. 7.

Figure 6:
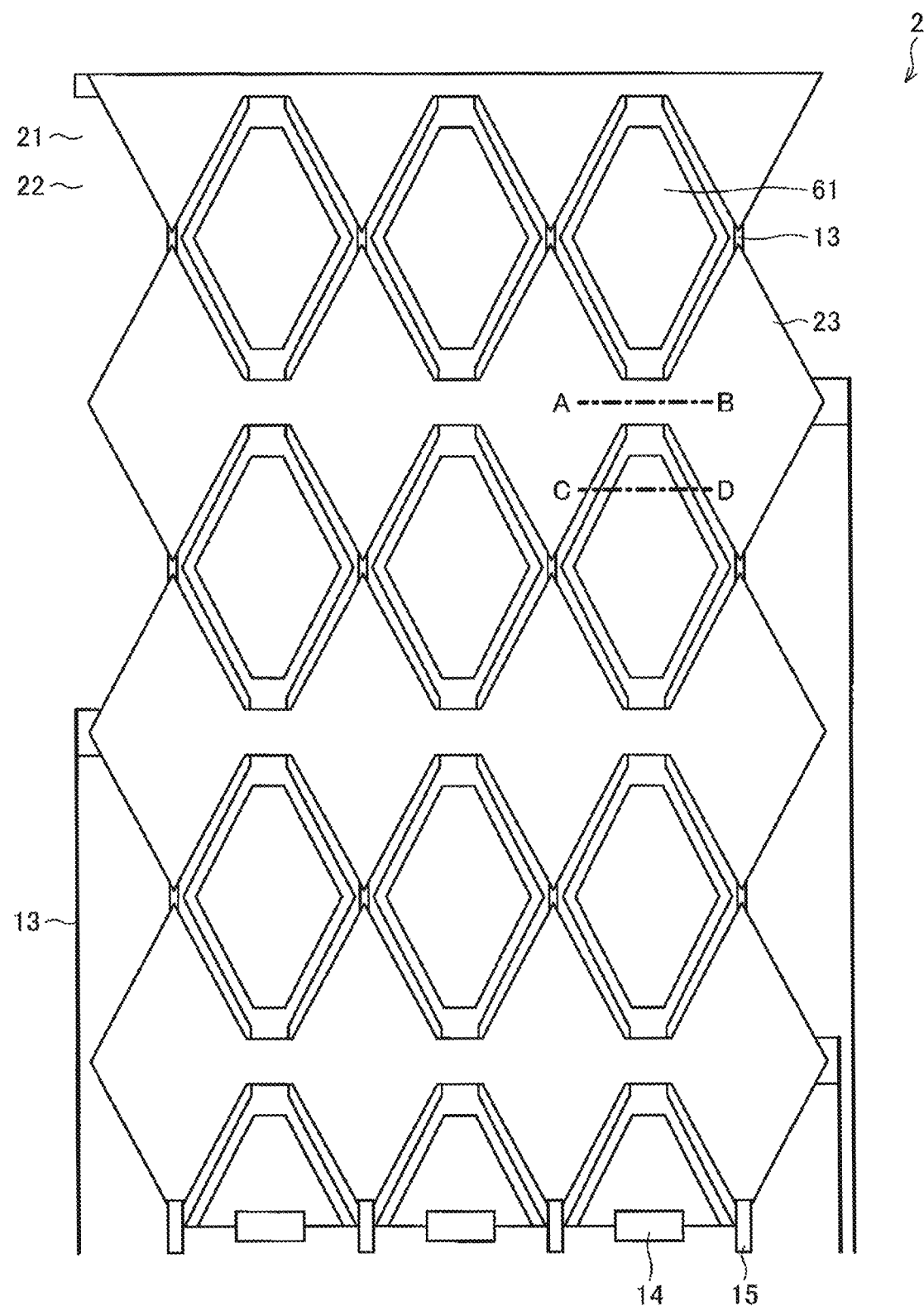
FIG. 6 is a plan view illustrating the internal configuration of a touch panel according to a second embodiment of the present invention.

FIG. 6 is a plan view illustrating the internal configuration of a touch panel 2 according to the second embodiment of the present invention. As illustrated in this drawing, the touch panel 2 further includes multiple floating electrodes 61, in addition to the respective members of the touch panel 1 illustrated in FIG. 2.

The multiple floating electrodes 61 are formed on the top face of the piezoelectric polymer layer 22. All of the multiple floating electrodes 61 have a rhombus shape. The multiple floating electrodes are electrically and physically separated from each other. One floating electrode 61 corresponds to one unit electrode composing the touch detection electrodes 24.

Figure 7:
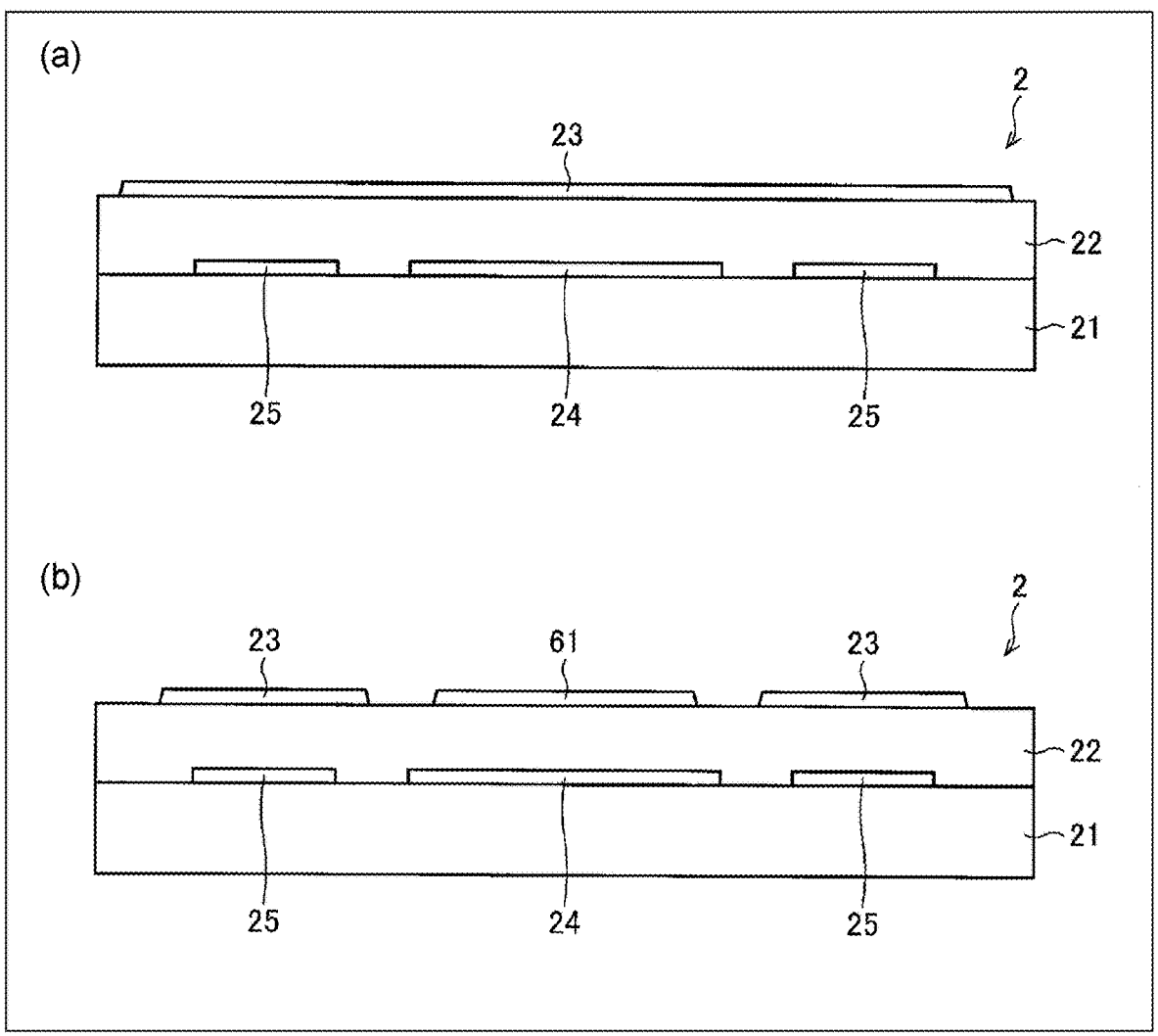
FIG. 7 includes cross-sectional views illustrating the cross-sectional structure of the touch panel according to the second embodiment of the present invention.

FIG. 7 includes cross-sectional views illustrating the cross-sectional structure of the touch panel 2 according to the second embodiment of the present invention. FIG. 7(a) illustrates a cross section taken along the A-B portion in FIG. 6 in the touch panel 2. FIG. 7(b) illustrates a cross section taken along the C-D portion in FIG. 6 in the touch panel 2.

The cross section taken along the A-B portion in FIG. 6 in the touch panel 2 is the same as the cross section taken along the A-B portion in FIG. 2 in the touch panel 1 of the first embodiment. As illustrated in FIG. 7(b), in the touch panel 2, the floating electrode 61 is arranged at a position opposed to the touch detection electrode 24, on the top face of the piezoelectric polymer layer 22.

Advantages of Second Embodiment

The touch panel 2 is capable of performing both the touched position detection and the pressing force detection without increasing the thickness of the touch panel 2, as in the touch panel 1 of the first embodiment. In addition, the touch panel 2 is capable of improving the visibility with the floating electrodes 61 formed between the driving electrodes 23. In the touch panel 2, in addition to signal paths connecting the driving electrodes 23 to the touch detection electrodes 24, signal paths connecting the driving electrodes 23, the floating electrodes 61, and the touch detection electrodes 24 in this order are formed. Accordingly, the magnitude of the touch detection signals is capable of being further increased, compared with that in the touch panel 1 of the first embodiment. This enables the touch panel 2 to more stably detect the touched position.

Third Embodiment

A third embodiment according to the present invention will herein be described with reference to FIG. 8 to FIG. 11.

Figure 8:
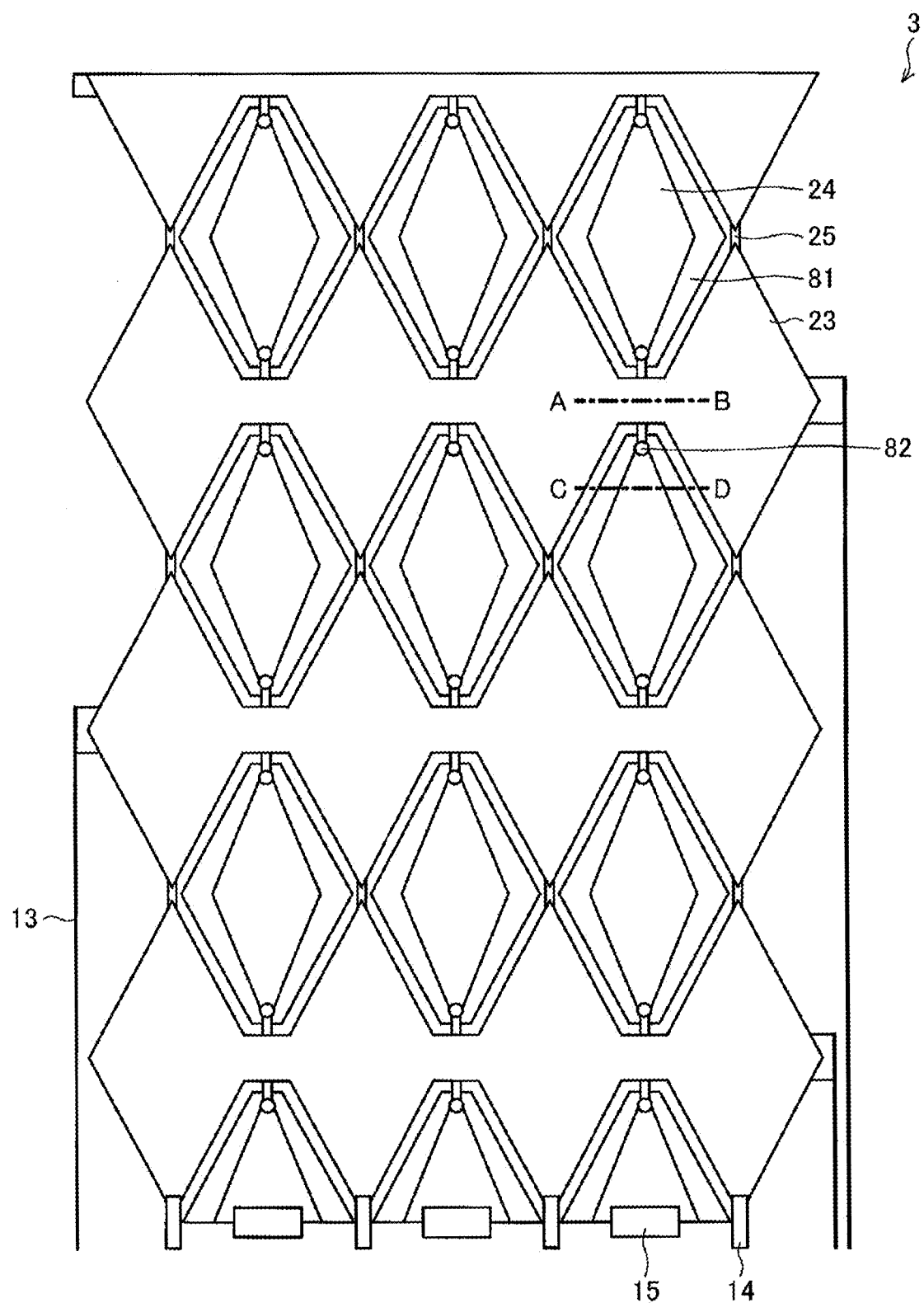
FIG. 8 is a plan view illustrating the internal configuration of a touch panel according to a third embodiment of the present invention.
Figure 9:
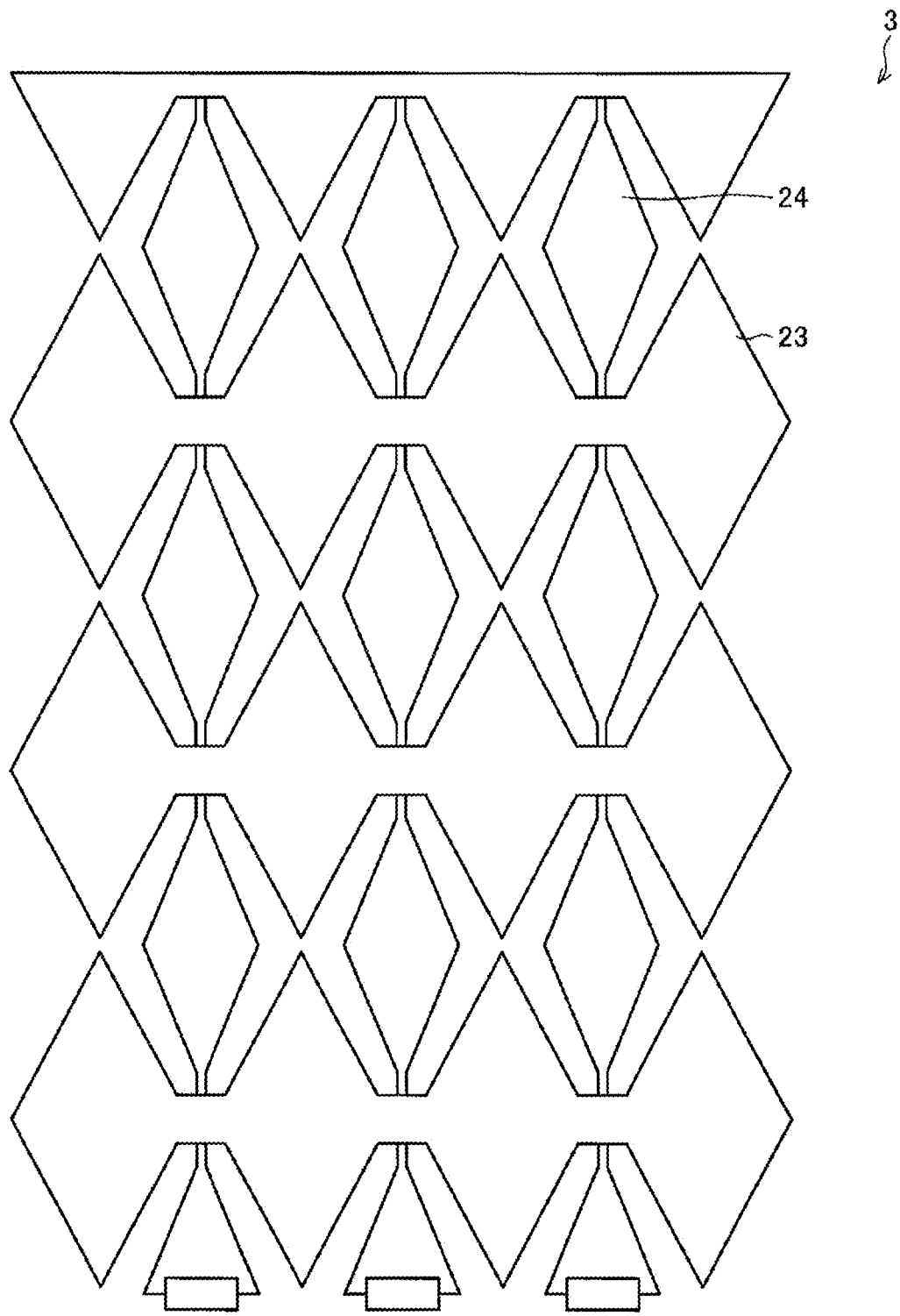
FIG. 9 is a diagram illustrating a first electrode layer of the touch panel according to the third embodiment of the present invention.
Figure 10:
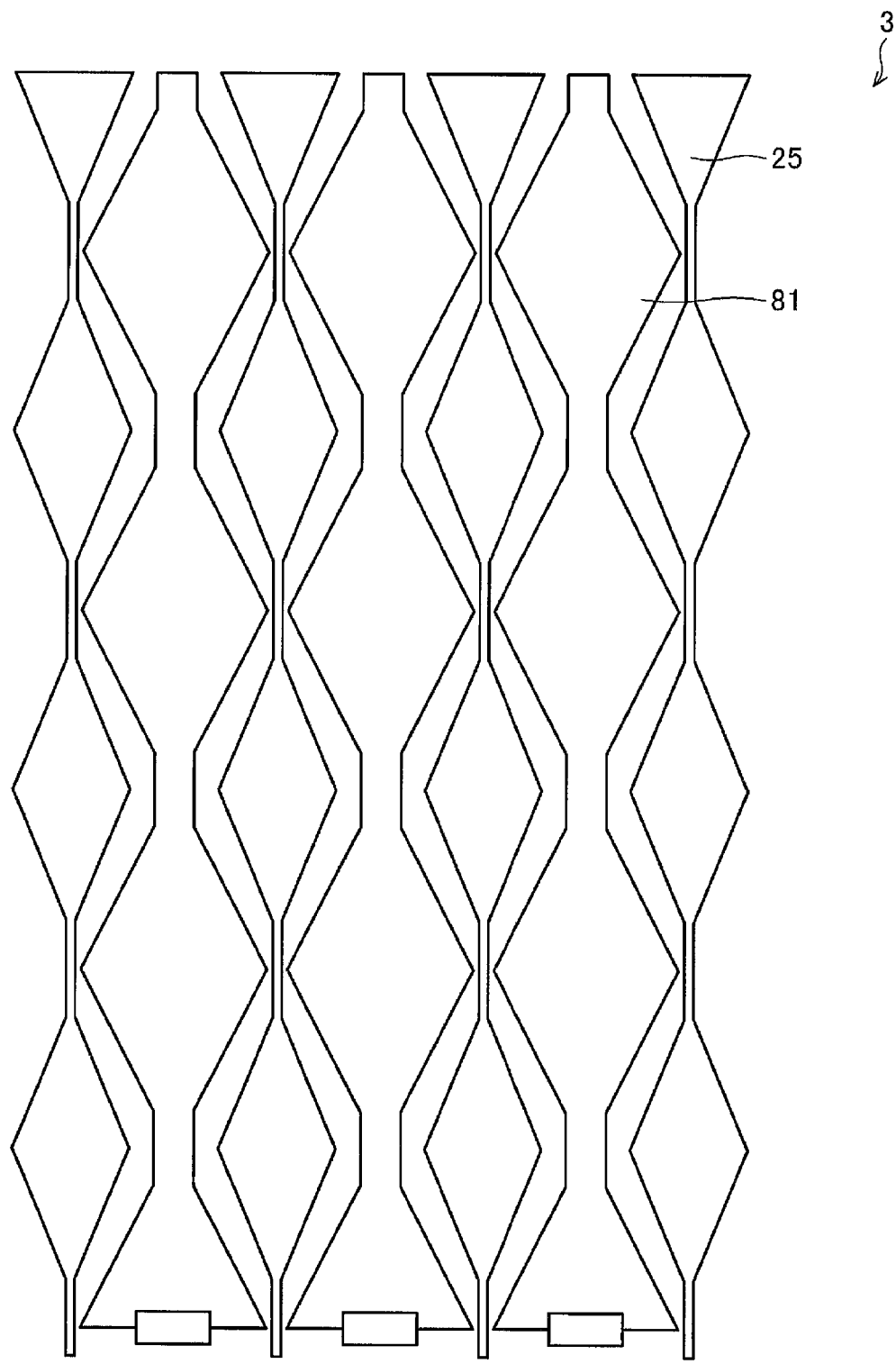
FIG. 10 is a diagram illustrating a second electrode layer of the touch panel according to the third embodiment of the present invention.

FIG. 8 is a plan view illustrating the internal configuration of a touch panel 3 according to the third embodiment of the present invention. FIG. 9 is a diagram illustrating the first electrode layer of the touch panel 3 according to the third embodiment of the present invention. FIG. 10 is a diagram illustrating the second electrode layer of the touch panel 3 according to the third embodiment of the present invention. As illustrated in these drawings, the touch panel 3 further includes multiple dummy electrodes 81 and multiple contact holes 82, in addition to the respective members of the touch panel 1 illustrated in FIG. 2.

In the touch panel 3, the driving electrodes 23 and the touch detection electrodes 24 are formed on the top face of the piezoelectric polymer layer 22. The pressing force detection electrodes 25 and the dummy electrodes 81 are formed on the bottom face of the piezoelectric polymer layer 22. The shapes and the extending directions of the driving electrodes 23, the touch detection electrodes 24, and the pressing force detection electrodes 25 are the same as those in the first embodiment. All of the multiple dummy electrodes 81 have a rhombus shape. The multiple dummy electrodes 81 are electrically and physically separated from each other. One dummy electrode 81 corresponds to one unit electrode composing the touch detection electrodes 24.

Figure 11:
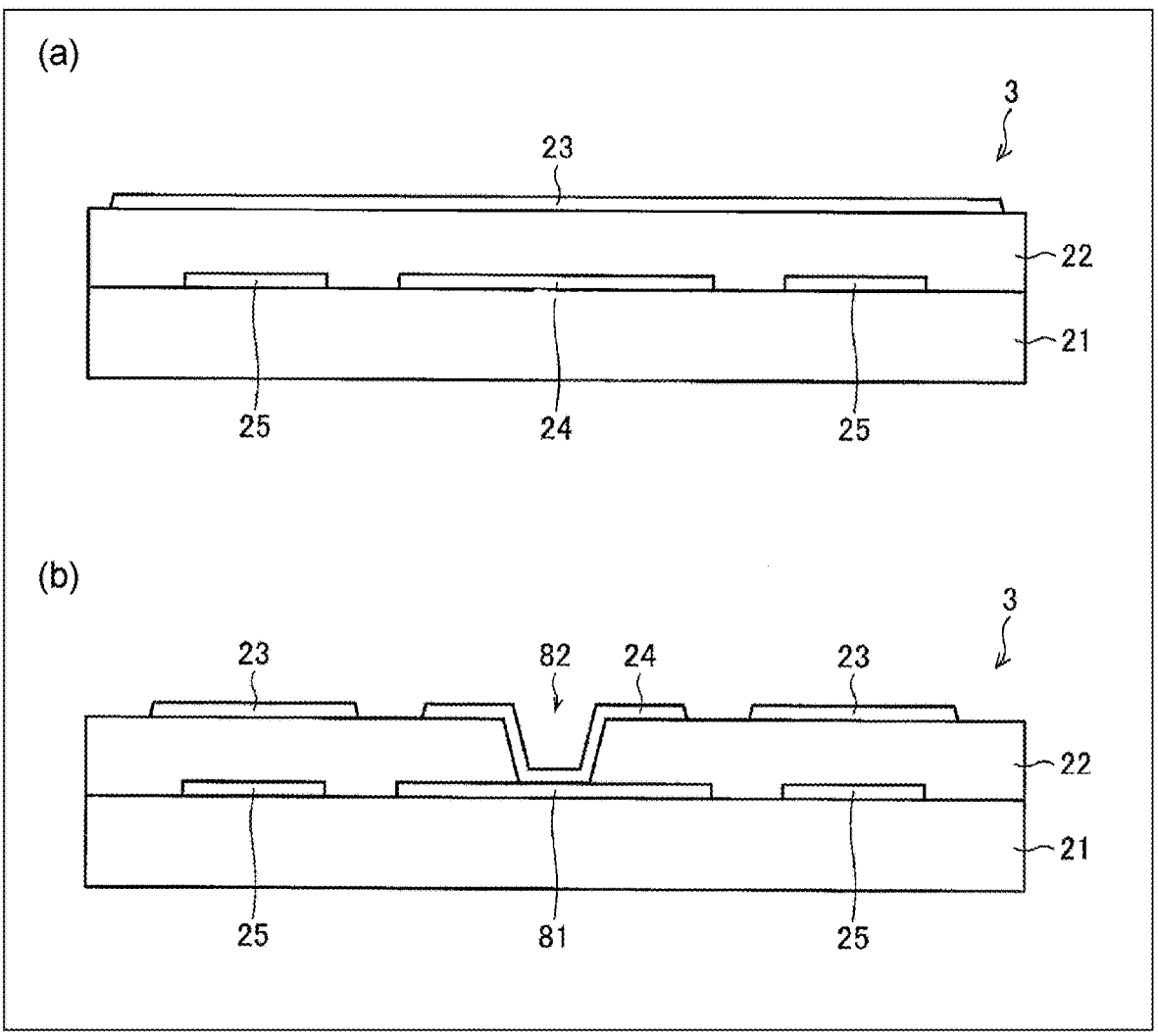
FIG. 11 includes cross-sectional views illustrating the cross-sectional structure of the touch panel according to the third embodiment of the present invention.

FIG. 11 includes cross-sectional views illustrating the cross-sectional structure of the touch panel 3 according to the third embodiment of the present invention. FIG. 11(a) illustrates a cross section taken along the A-B portion in FIG. 8 in the touch panel 3. FIG. 11(b) illustrates a cross section taken along the C-D portion in FIG. 8 in the touch panel 3.

As illustrated in FIG. 11(a), the cross section taken along the A-B portion in FIG. 8 in the touch panel 3 is the same as the cross section taken along the A-B portion in FIG. 2 in the touch panel 1 of the first embodiment. As illustrated in FIG. 11(b), in the touch panel 3, the dummy electrode 81 is arranged at a position opposed to the touch detection electrode 24, on the bottom face of the piezoelectric polymer layer 22. The contact hole 82 is formed in the touch detection electrode 24. The touch detection electrode 24 is connected to the opposing dummy electrode 81 at the portion where the contact hole 82 is formed.

Advantages of Third Embodiment

The touch panel 3 is capable of performing both the touched position detection and the pressing force detection without increasing the thickness of the touch panel 3, as in the touch panel 1 of the first embodiment. In addition, the touch panel 3 is capable of improving the visibility with the touch detection electrodes 24 formed between the driving electrodes 23. Since the touch detection electrodes are connected to the dummy electrodes 81 in the touch panel 3, the load capacitance in the piezoelectric polymer layer 22 is decreased, compared with that in the touch panel 1 or 2. Accordingly, it is possible to further improve the performance of the touch panel 3.

Fourth Embodiment

A fourth embodiment according to the present invention will herein be described with reference to FIG. 12 to FIG. 15.

Figure 12:
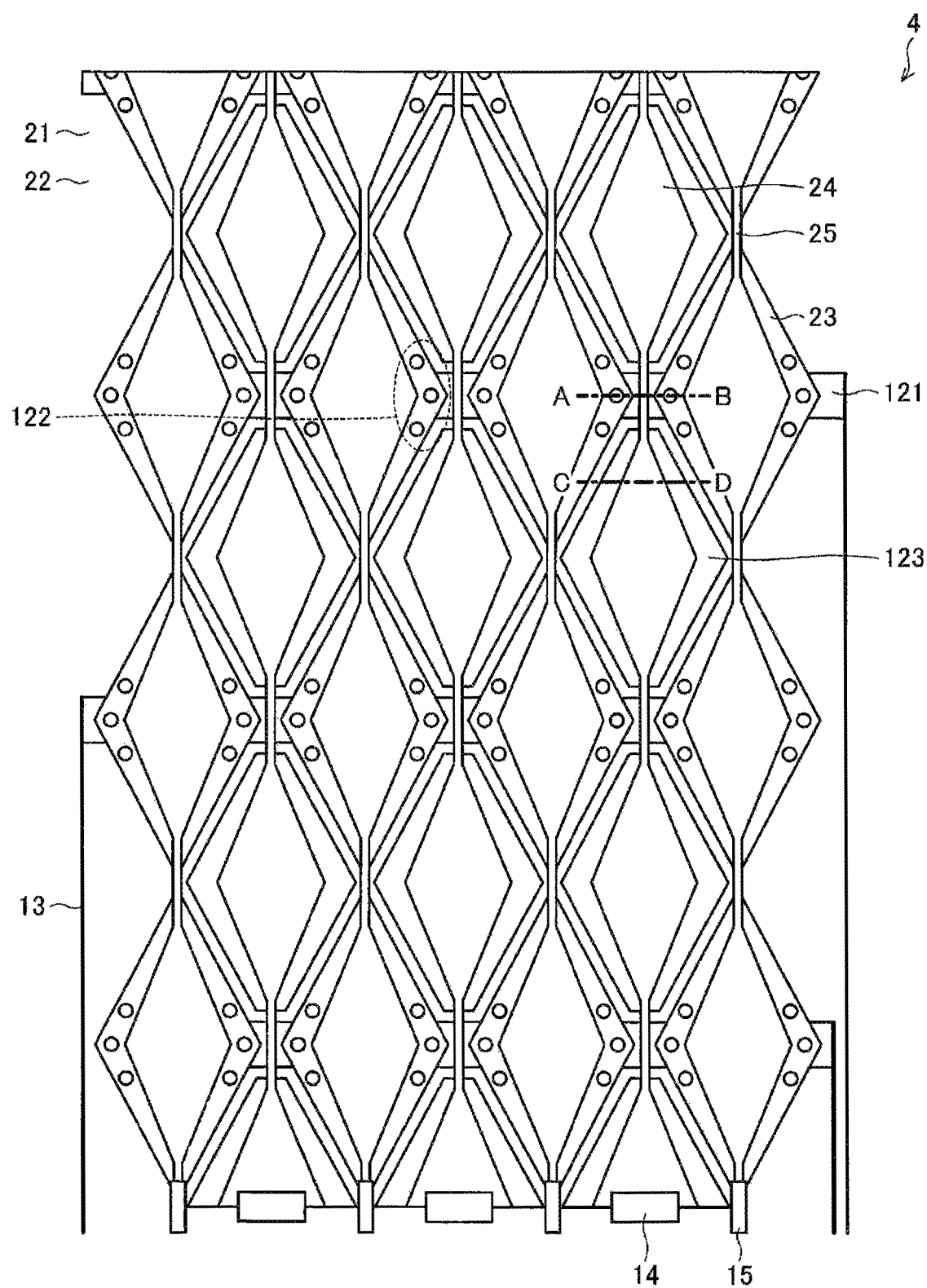
FIG. 12 is a plan view illustrating the internal configuration of a touch panel according to a fourth embodiment of the present invention.
Figure 13:
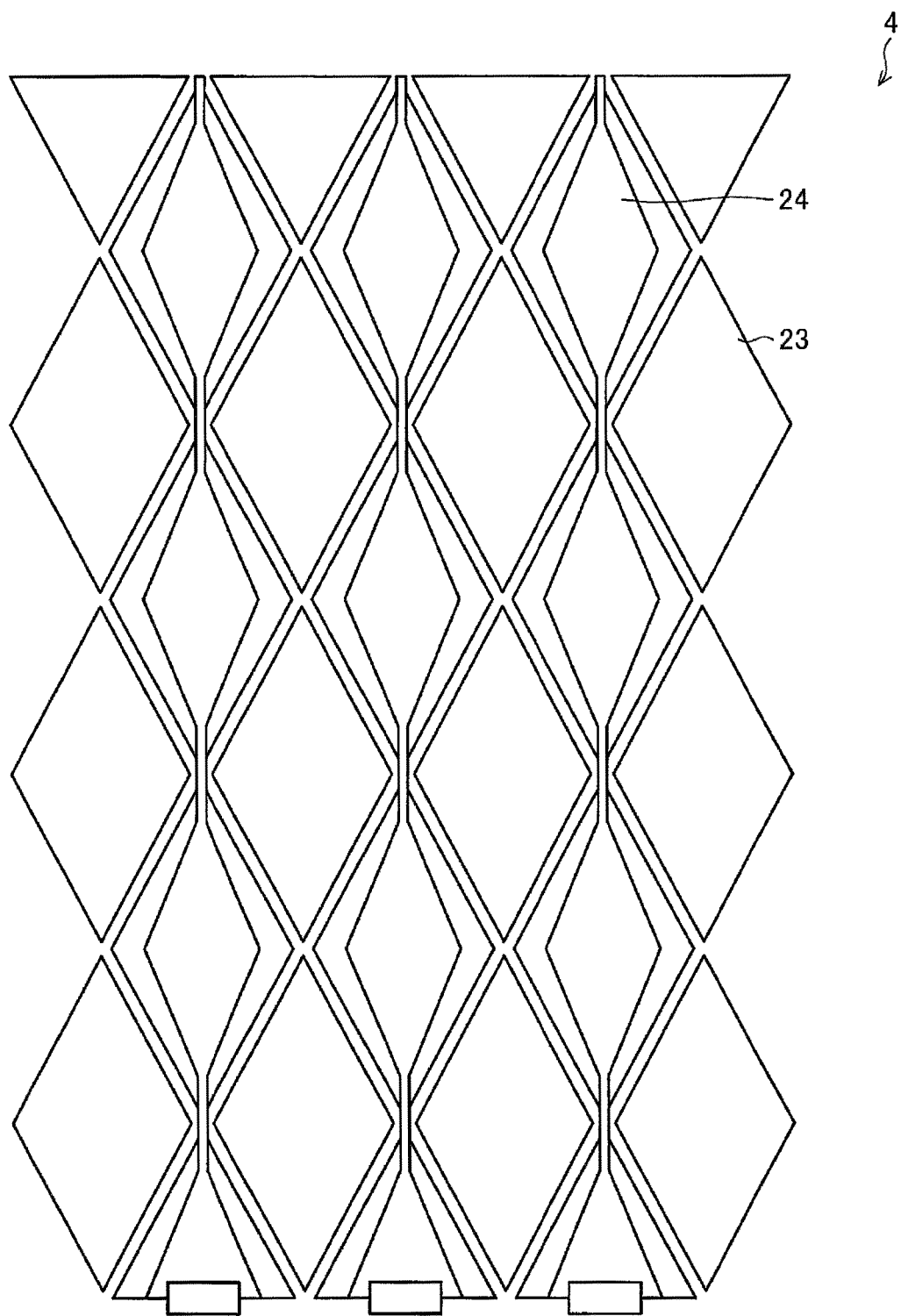
FIG. 13 is a diagram illustrating the first electrode layer of the touch panel according to the fourth embodiment of the present invention.
Figure 14:
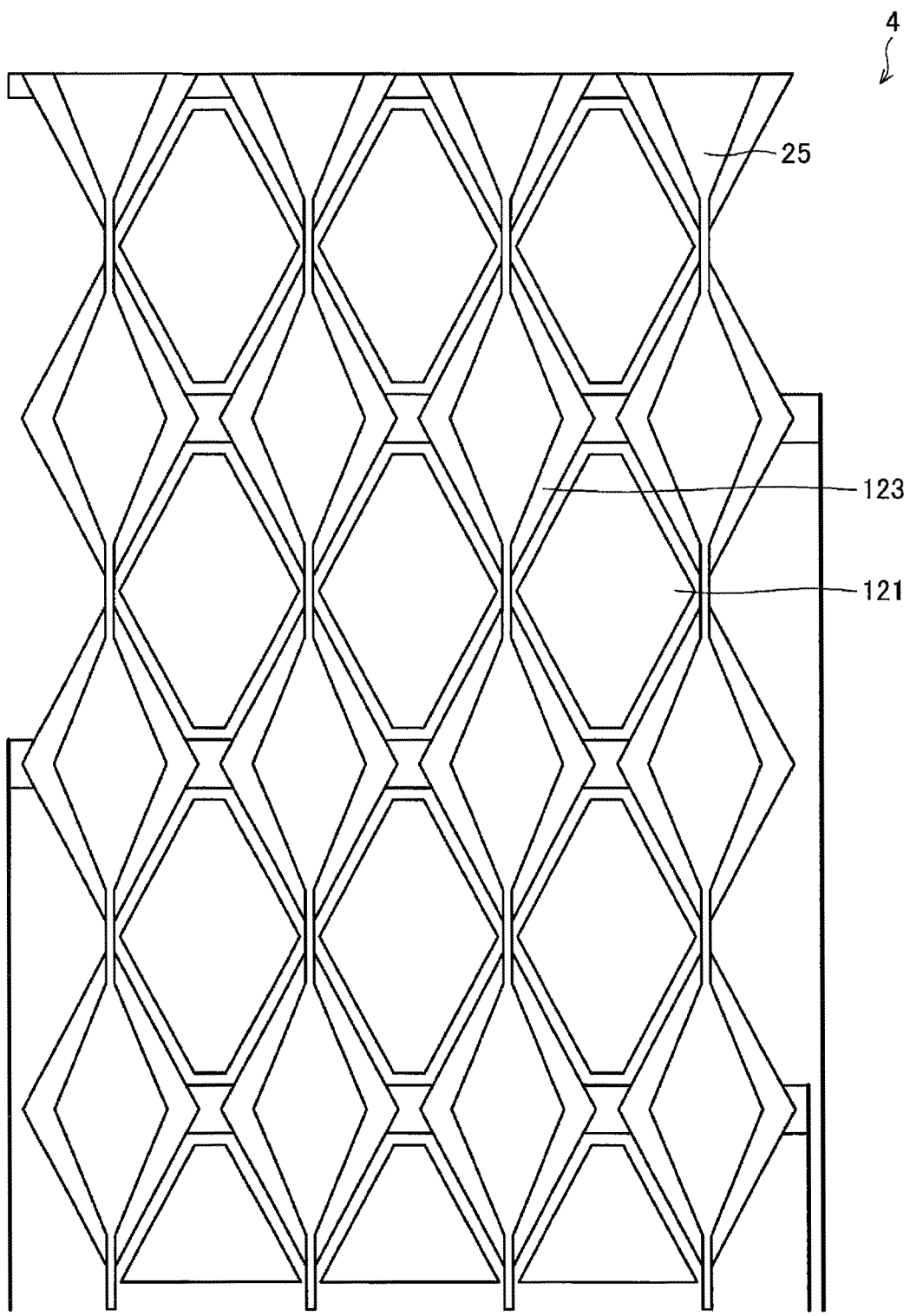
FIG. 14 is a diagram illustrating the second electrode layer of the touch panel according to the fourth embodiment of the present invention.

FIG. 12 is a plan view illustrating the internal configuration of a touch panel 4 according to the fourth embodiment of the present invention. FIG. 13 is a diagram illustrating the first electrode layer of the touch panel 4 according to the fourth embodiment of the present invention. FIG. 14 is a diagram illustrating the second electrode layer of the touch panel 4 according to the fourth embodiment of the present invention. As illustrated in these drawings, the touch panel 4 further includes multiple contact layers 121, multiple contact holes 122, and multiple bridge patterns 123, in addition to the respective members of the touch panel 1 illustrated in FIG. 2.

In the touch panel 4, the driving electrodes 23 and the touch detection electrodes 24 are formed on the top face of the piezoelectric polymer layer 22. The pressing force detection electrodes 25, the contact layers 121, and the bridge patterns 123 are formed on the bottom face of the piezoelectric polymer layer 22. The shapes and the extending directions of the driving electrodes 23, the touch detection electrodes 24, and the pressing force detection electrodes 25 are the same as those in the first embodiment. All of the multiple contact layers 121 have a rhombus shape. The multiple contact layers 121 are electrically and physically separated from each other. One contact layer 121 corresponds to two unit electrodes composing the driving electrodes 23.

Figure 15:
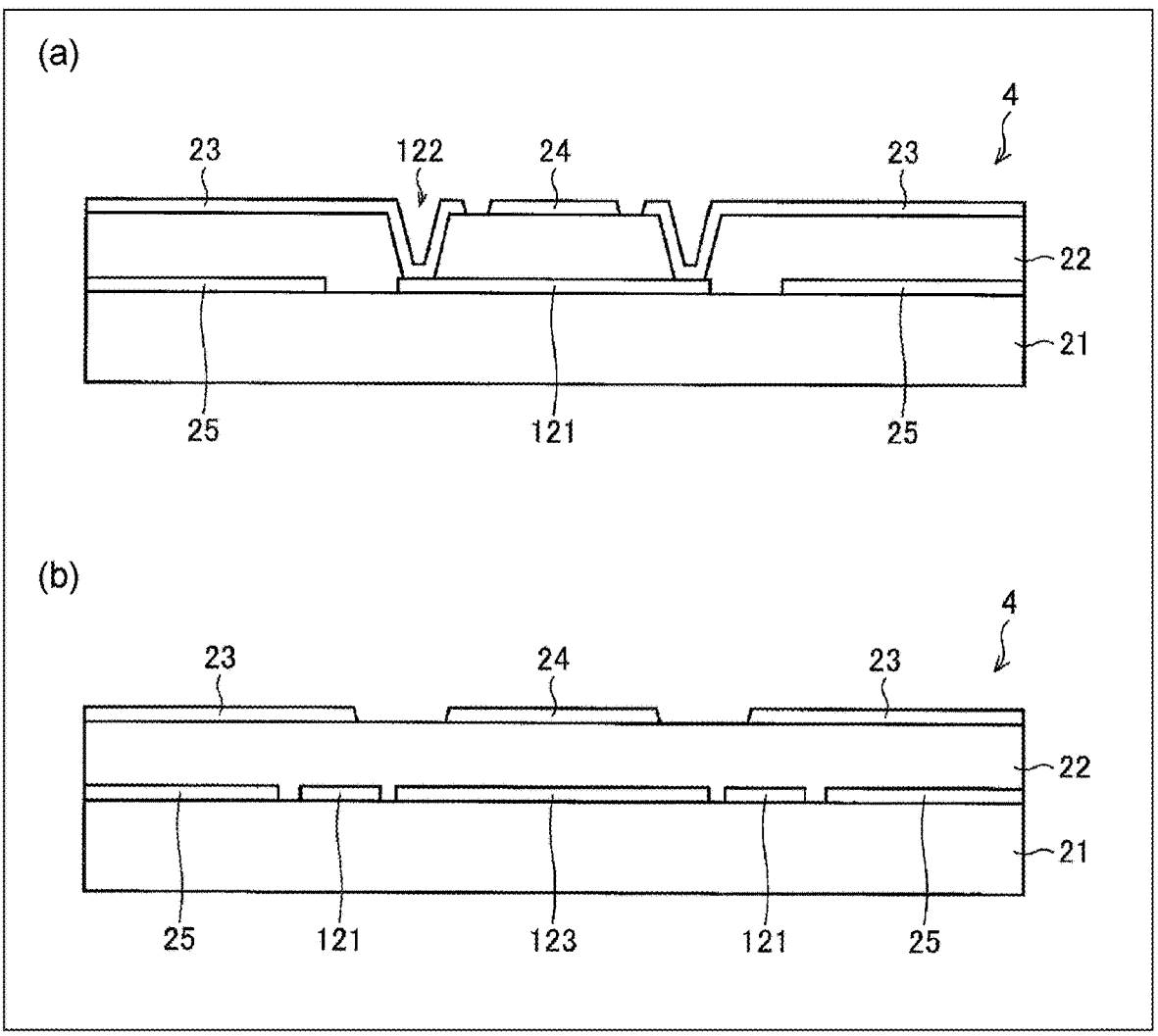
FIG. 15 includes cross-sectional views illustrating the cross-sectional structure of the touch panel according to the fourth embodiment of the present invention.

FIG. 15 includes cross-sectional views illustrating the cross-sectional structure of the touch panel 4 according to the fourth embodiment of the present invention. FIG. 15(a) illustrates a cross section taken along the A-B portion in FIG. 12 in the touch panel 4. FIG. 15(b) illustrates a cross section taken along the C-D portion in FIG. 12 in the touch panel 4. As illustrated in FIG. 15(a), the cross section taken along the A-B portion in FIG. 12 in the touch panel 4 is the same as the cross section taken along the A-B portion in FIG. 2 in the touch panel 1 of the first embodiment. As illustrated in FIG. 15(a), in the touch panel 4, the contact layer 121 is arranged at a position opposed to the touch detection electrode 24, on the bottom face of the piezoelectric polymer layer 22. The contact holes 122 are formed at portions opposed to the contact layer 121, of the driving electrodes 23. The driving electrodes 23 are connected to the opposing contact layers 121 at the portions where the contact holes 122 are formed. The contact layers 121 have a function to extend the driving electrodes 23 in the lateral direction.

As illustrated in FIG. 15(b), part of the contact layers 121 extends to the positions apart from the contact holes 122 in the longitudinal direction (the longitudinal direction) of the touch panel 4. The bridge patterns 123 is connected to the touch detection electrode 24 at the portion where the contact hole is formed, which is not illustrated in FIG. 15.

Advantages of Fourth Embodiment

The touch panel 4 is capable of performing both the touched position detection and the pressing force detection without increasing the thickness of the touch panel 4, as in the touch panel 1 of the first embodiment. The touch panel 4 is capable of improving the visibility with the touch detection electrodes 24 formed between the driving electrodes 23. Since the touch detection electrodes 24 are connected to the bridge patterns 123 in the touch panel 4, the load capacitance in the piezoelectric polymer layer 22 is decreased, compared with that in the touch panel 1 or 2. Accordingly, it is possible to further improve the performance of the touch panel 4.

Fifth Embodiment

A fifth embodiment according to the present invention will herein be described with reference to FIG. 16 and FIG. 17.

Figure 16:
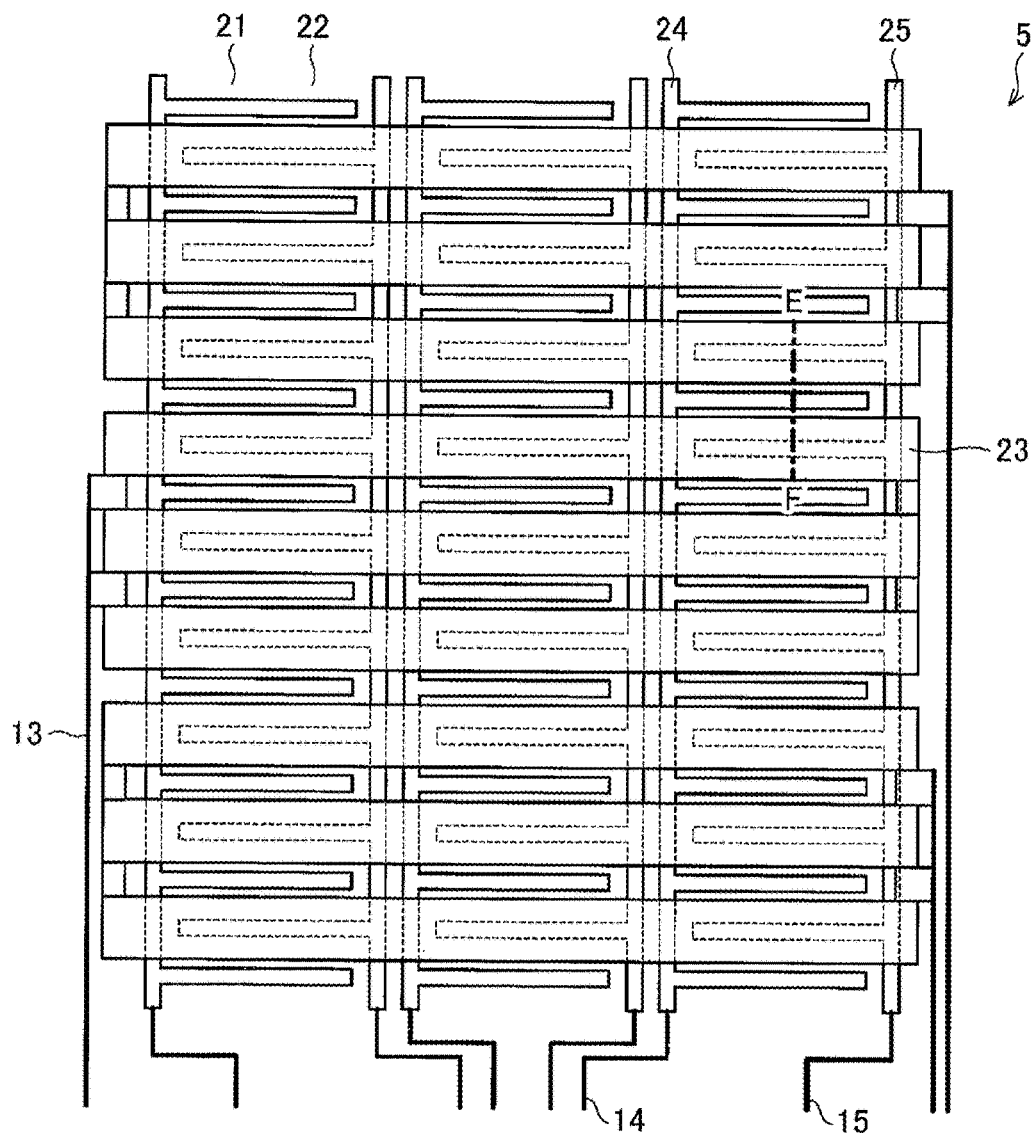
FIG. 16 is a plan view illustrating the internal configuration of a touch panel according to a fifth embodiment of the present invention.

FIG. 16 is a plan view illustrating the internal configuration of a touch panel 5 according to the fifth embodiment of the present invention. As illustrated in this drawing, the touch panel 5 includes the same members as those in the touch panel 1 illustrated in FIG. 2. The driving electrodes 23 are formed on the first electrode layer of the touch panel 5 and extend in the lateral direction, as in the first embodiment. The touch detection electrodes 24 and the pressing force detection electrodes 25 are formed on the second electrode layer of the touch panel 5 and extend in the longitudinal direction, as in the first embodiment. In the touch panel 5, all of the driving electrodes 23, the touch detection electrodes 24, and the pressing force detection electrodes 25 have comb shapes.

Figure 17:
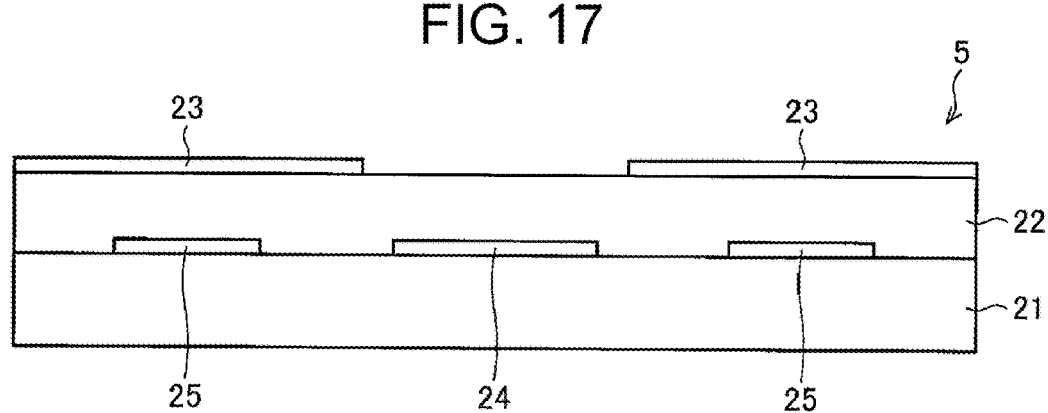
FIG. 17 is a cross-sectional view illustrating the cross section taken along the E-F portion in FIG. 16 in the touch panel according to the fifth embodiment of the present invention.

FIG. 17 is a cross-sectional view illustrating the cross section taken along the E-F portion in FIG. 16 in the touch panel 5 according to the fifth embodiment of the present invention. As illustrated in FIG. 17, the cross section taken along the E-F portion in FIG. 16 in the touch panel 5 is the same as the cross section taken along the A-B portion in FIG. 2 in the touch panel 1 of the first embodiment.

Advantages of Fifth Embodiment

Since all of the driving electrodes 23, the touch detection electrodes 24, and the pressing force detection electrodes 25 have comb shapes in the touch panel 5, it is possible to further improve the detection sensitivity of the touched position.

Sixth Embodiment

A sixth embodiment according to the present invention will herein be described with reference to FIG. 18 and FIG. 20.

Figure 18:
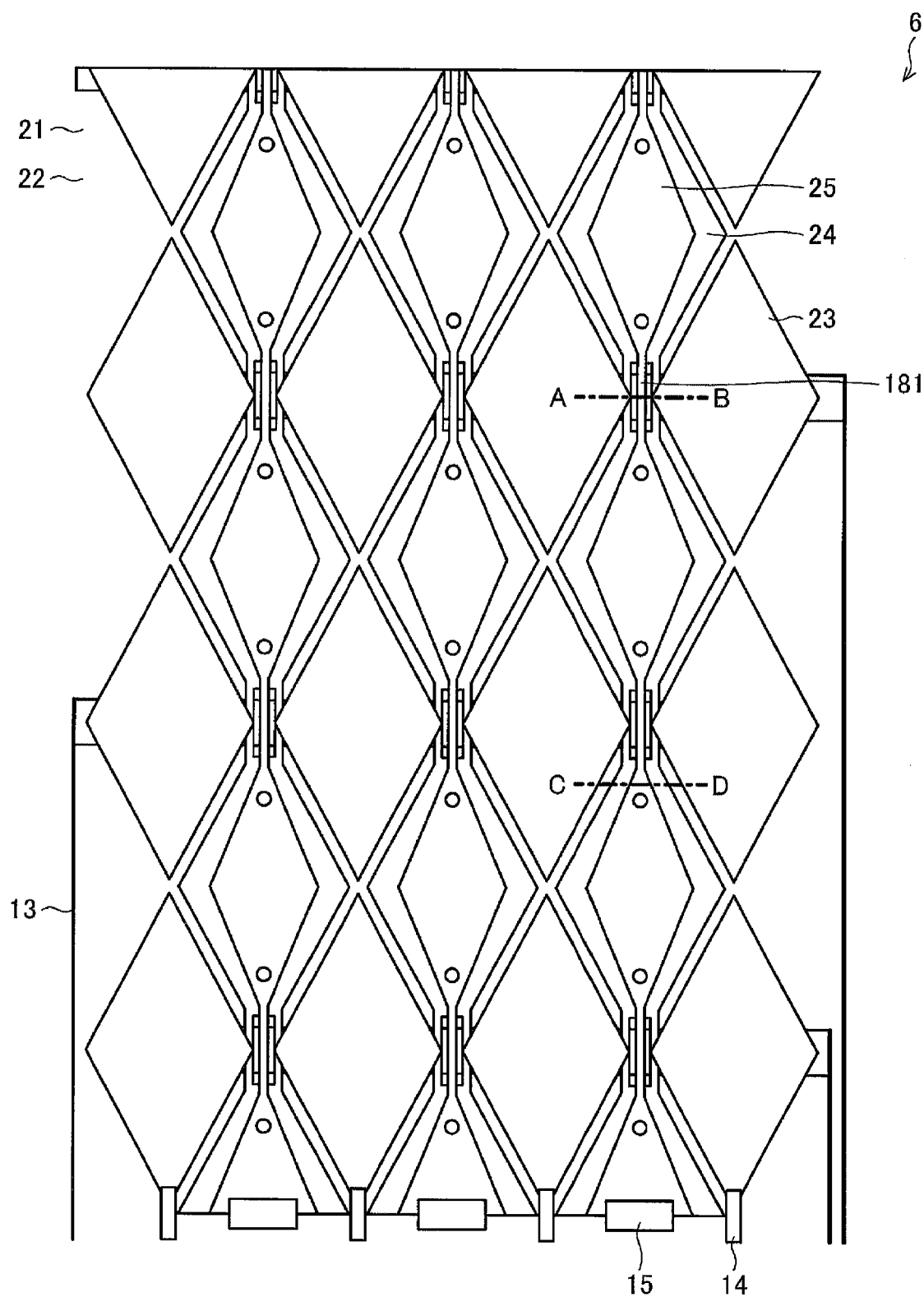
FIG. 18 is a plan view illustrating the internal configuration of a touch panel according to a sixth embodiment of the present invention.

FIG. 18 is a plan view illustrating the internal configuration of a touch panel 6 according to the sixth embodiment of the present invention. As illustrated in this drawing, the touch panel 6 further includes contact layers 181, in addition to the respective members of the touch panel 1 illustrated in FIG. 2.

In the sixth embodiment, the touch detection electrodes 24 and the contact layers 181 are formed on the top face of the piezoelectric polymer layer 22. The driving electrodes 23 and the pressing force detection electrodes 25 are formed on the bottom face of the piezoelectric polymer layer 22. All of the driving electrodes 23, the touch detection electrodes 24, and the pressing force detection electrodes 25 have rhombus shapes. The directions in which the driving electrodes 23, the touch detection electrodes 24, and the pressing force detection electrodes 25 extend are the same as those in the first embodiment.

Figure 19:
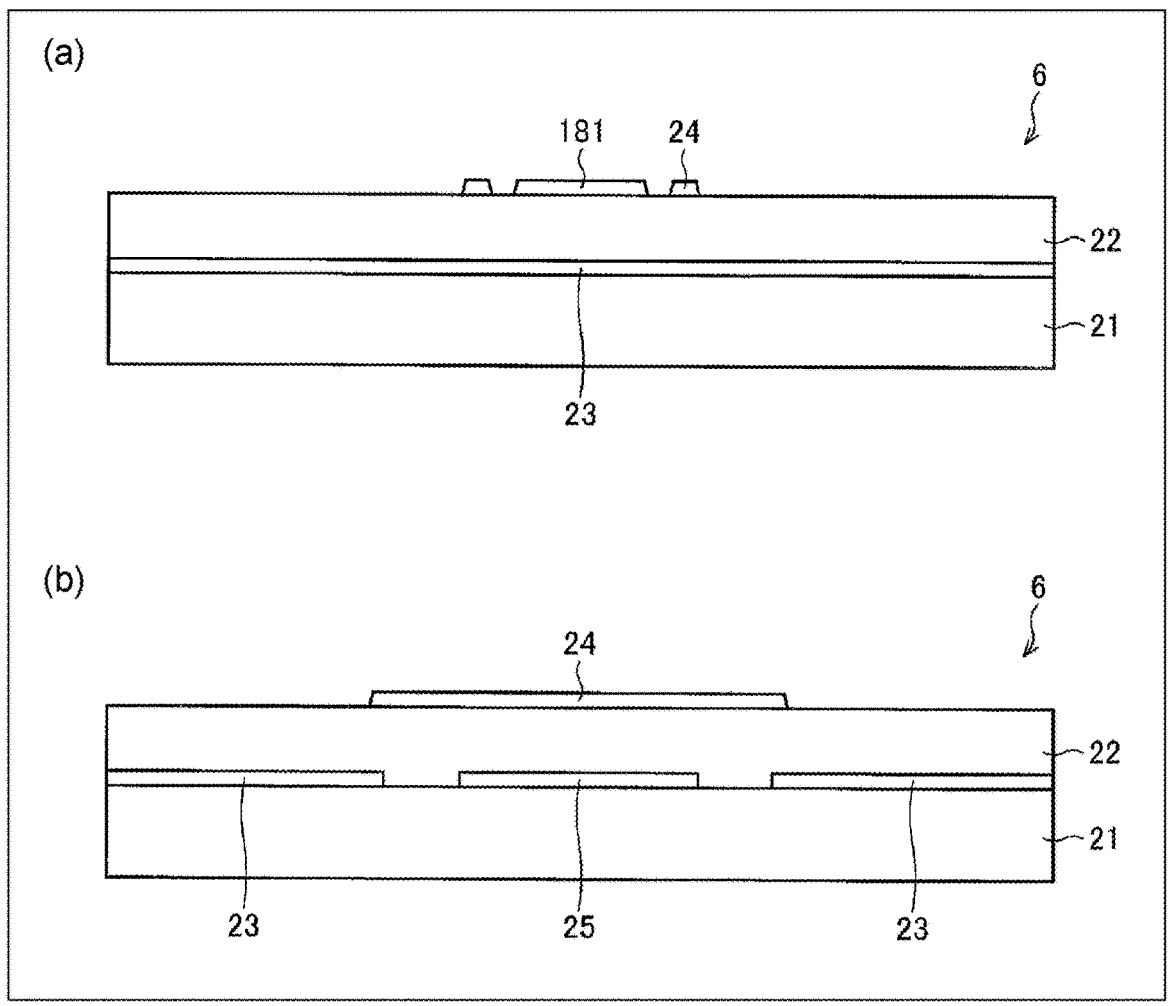
FIG. 19 includes cross-sectional views illustrating the cross-sectional structure of the touch panel according to the sixth embodiment of the present invention.

FIG. 19 includes cross-sectional views illustrating the cross-sectional structure of the touch panel 6 according to the sixth embodiment of the present invention. FIG. 19(a) illustrates a cross section taken along the A-B portion in FIG. 18 in the touch panel 6. FIG. 19(b) illustrates a cross section taken along the C-D portion in FIG. 18 in the touch panel 6.

As illustrated in FIG. 19(a), the cross section taken along the A-B portion in FIG. 12 in the touch panel 6 is the same as the cross section taken along the A-B portion in FIG. 2 in the touch panel 1 of the first embodiment.

As illustrated in FIG. 19(a), the contact layer 181 is arranged between the adjacent touch detection electrodes 24 on the top face of the piezoelectric electrically connects the two unit electrodes of the adjacent pressing force detection electrodes 25. Since the unit electrodes are connected to each other with the contact layers 181, the pressing force detection electrodes 25 extend in the lateral direction of the touch panel 6.

As illustrated in FIG. 19(b), the touch detection electrode 24 is opposed to the pressing force detection electrode 25 with the piezoelectric polymer layer 22 disposed therebetween. In other words, the pressing force detection electrode 25 is arranged below the touch detection electrode 24 in the touch panel 6.

Figure 20:
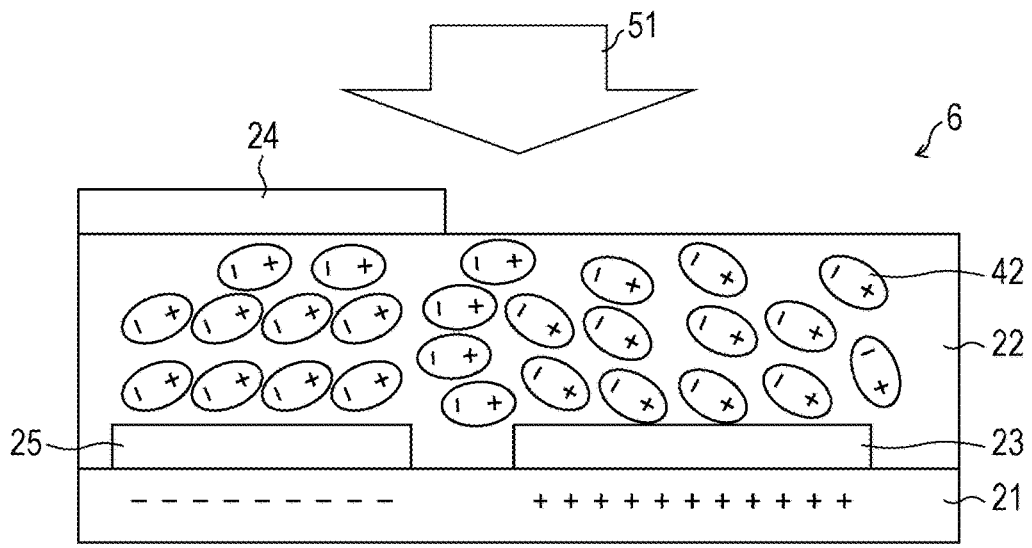
FIG. 20 is a diagram for describing a principle of detecting the pressing force by the touch panel according to the sixth embodiment of the present invention.

FIG. 20 is a diagram for describing a principle of detecting the pressing force by the touch panel 6 according to the sixth embodiment of the present invention. In the sixth embodiment, the piezoelectric materials of the piezoelectric polymer layer 22 have d31-mode piezoelectricity. When the pressing force 51 of the finger 41 is applied to the surface of the touch panel 6, electric charge occurs on the surfaces of the piezoelectric materials in the piezoelectric polymer layer 22. The occurrence of the electric charge varies the electrostatic capacitance between the driving electrode 23 and the pressing force detection electrode 25, which are arranged on the bottom face of the piezoelectric polymer layer 22.

Seventh Embodiment

A seventh embodiment according to the present invention will herein be described with reference to FIG. 21 and FIG. 22.

Figure 21:
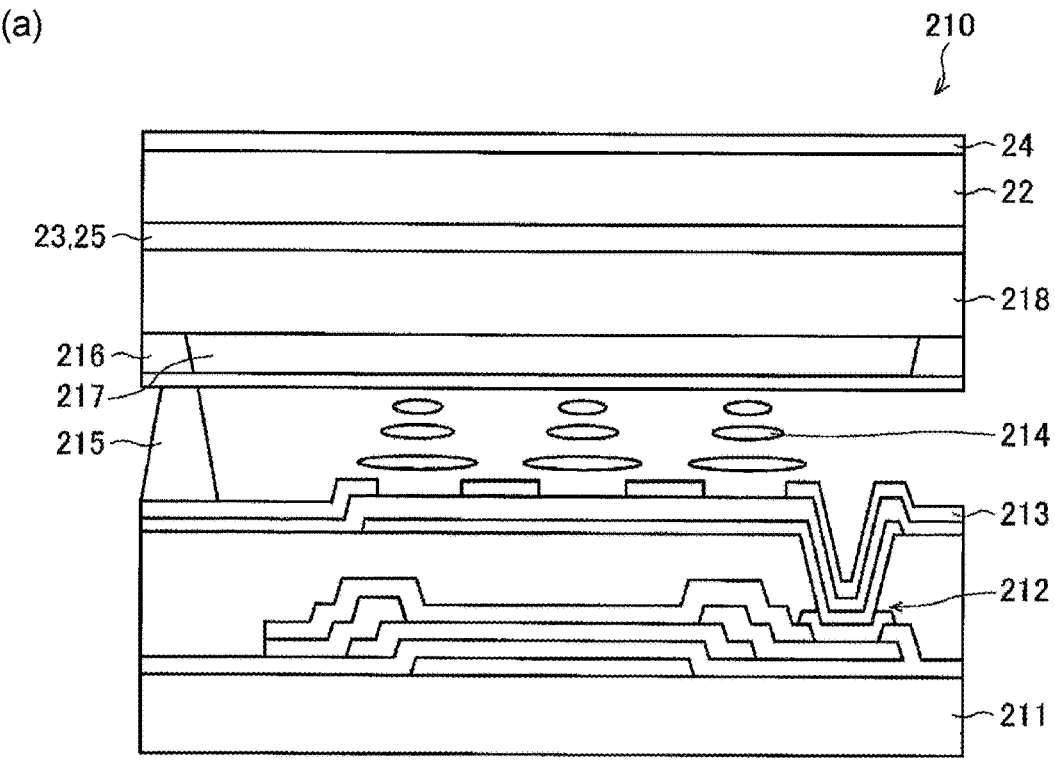
FIG. 21 includes cross-sectional views illustrating the cross-sectional configurations of liquid crystal display devices each including any of the touch panels according to the respective embodiments of the present invention.
Figure 21:
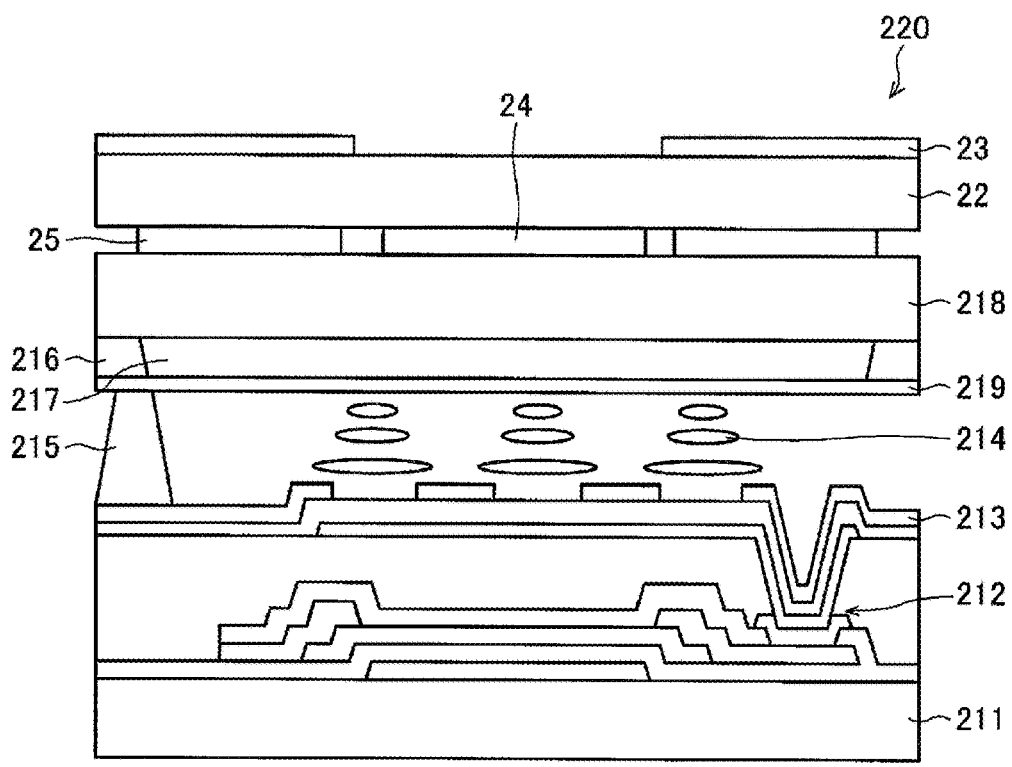

FIG. 21 includes cross-sectional views illustrating the cross-sectional configurations of liquid crystal display devices 210 and 220 each including any of the touch panels 1 to 6 according to the respective embodiments of the present invention. FIG. 21(a) illustrates the liquid crystal display device 210 that has an on-cell structure and that includes the touch panel 6 according to the sixth embodiment. FIG. 21(b) illustrates the liquid crystal display device 220 that has an in-cell structure and that includes the touch panel 4 according to the fourth embodiment.

As illustrated in FIG. 21(a), the liquid crystal display device 210 at least includes a thin film transistor (TFT) substrate 211, a TFT 212, an indium tin oxide (ITO) layer 213, liquid crystal 214, a spacer 215, a black matrix 216, a color filter (CF) 217, a CF substrate 218, the piezoelectric polymer layer 22, the driving electrodes 23, the touch detection electrodes 24, and the pressing force detection electrodes 25. The layer structure of the touch panel 6 according to the sixth embodiment is formed on the CF substrate 218. In other words, the CF substrate 218 also serves as the transparent substrate 21.

As illustrated in FIG. 21(b), the liquid crystal display device 220 further includes a driving electrode 219, in addition to the various members of the liquid crystal display device 210. The layer structure of the touch panel 4 according to the fourth embodiment is formed on the CF substrate 218. In other words, the CF substrate 218 also serves as the transparent substrate 21. The driving electrode 219 is formed on the bottom face of the CF substrate 218. The driving electrode 219 has a function to drive the touch panel 4 in cooperation with the driving electrodes 23. In other words, the detection circuit 12 in the liquid crystal display device 220 supplies the driving signals to both the driving electrodes 23 and the driving electrode 219. Accordingly, it is possible to further improve the detection sensitivity of the touch panel 4.

Figure 22:
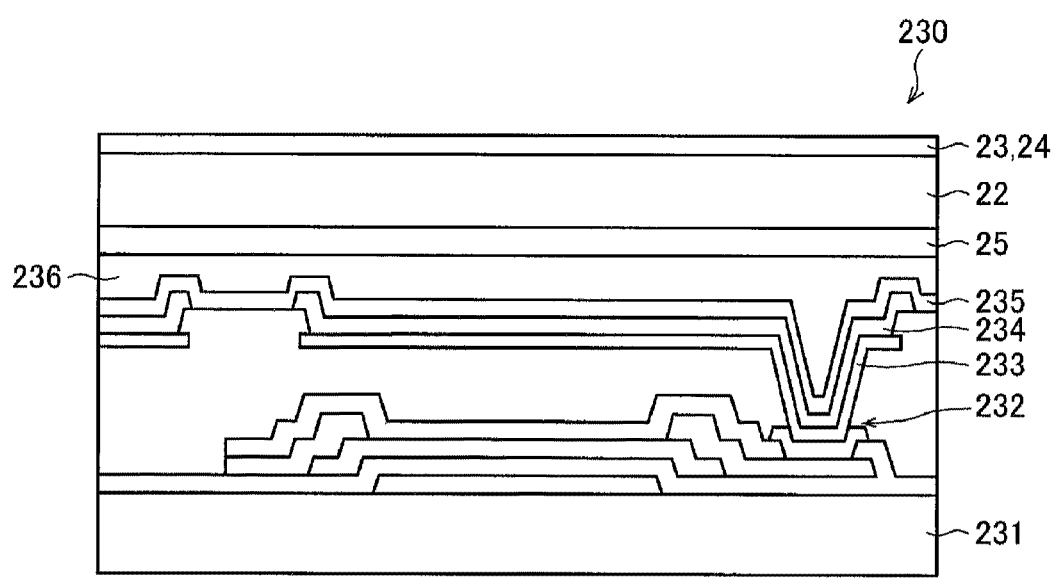
FIG. 22 is a cross-sectional view illustrating the cross-sectional configuration of an organic EL display device including any of the touch panels according to the respective embodiments of the present invention.

FIG. 22 is a cross-sectional view illustrating the cross-sectional configuration of an organic electroluminescent (EL) display device 230 including any of the touch panels 1 to 6 according to the respective embodiments of the present invention. As illustrated in this drawing, the organic EL display device 230 includes a glass substrate 231, a TFT 232, an anode 233, an organic EL layer 234, a cathode 235, a protective layer 236, the piezoelectric polymer layer 22, the driving electrodes 23, the touch detection electrodes 24, and the pressing force detection electrodes 25. The protective layer 236 is also called a planarization film. In the example in FIG. 22, the layer structure of the touch panel 4 according to the fourth embodiment is formed on the protective layer 236. In other words, the protective layer 236 also serves as the transparent substrate 21 of the touch panel 4.

According to the seventh embodiment, it is possible to realize the liquid crystal display device and the organic EL display device capable of performing both the touched position detection and the pressing force detection without increasing the thickness of any of the touch panels 1 to 6.

[Summary]

The touch panels (1 to 6) according to a first aspect of the present invention are each characterized by including a piezoelectric polymer layer (22), a driving electrode (23) formed on a first main surface of the piezoelectric polymer layer, a pressing force detection electrode (25) formed on a second main surface of the piezoelectric polymer layer, and a touch detection electrode (24) formed on the first main surface or the second main surface of the piezoelectric polymer layer.

With the above configuration, it is possible to realize the touch panel capable of performing both the touched position detection and the pressing force detection without increasing the thickness of the touch panel.

The touch panel according to a second aspect of the present invention is characterized in that, in the first aspect, the pressing force detection electrode is formed at a position overlapped with the driving electrode or the touch detection electrode.

With the above configuration, it is possible to more stably detect the touched position.

The touch panel according to a third aspect of the present invention is characterized in that, in the first or second aspect, the touch detection electrode is formed on the second main surface, and in that the touch panel further includes a floating electrode that is formed at a position on the first main surface, which is opposed to the touch detection electrode, and that is electrically separated from the touch detection electrode.

With the above configuration, it is possible to improve the visibility of the touch panel.

The touch panel according to a fourth aspect of the present invention is characterized in that, in the first or second aspect, the touch detection electrode is formed on the first main surface and in that the touch panel further includes a dummy electrode that is formed at a position on the first main surface, which is opposed to the touch detection electrode, and that is electrically connected to the touch detection electrode.

With the above configuration, it is possible to improve the visibility of the touch panel.

The touch panel according to a fifth aspect of the present invention is characterized in that, in any of the first to fourth aspects, the driving electrode, the touch detection electrode, and the pressing force detection electrode have rhombus shapes.

With the above configuration, it is possible to improve the detection sensitivity of the touched position.

The touch panel according to a sixth aspect of the present invention is characterized in that, in the first or second aspect, the driving electrode, the touch detection electrode, and the pressing force detection electrode have comb shapes.

With the above configuration, it is possible to improve the detection sensitivity of the touched position.

The display device according to a seventh aspect of the present invention is characterized by including any of the touch panels described above.

With the above configuration, it is possible to realize the display device capable of performing both the touched position detection and the pressing force detection without increasing the thickness of the touch panel.

The present invention is not limited to the respective embodiments described above and various modifications are available within the range indicated in the claims. Embodiments resulting from arbitrary combination of technical measures disclosed in different embodiments are also included in the technical range of the present invention. The technical measures disclosed in the respective embodiments may be combined to provide new technical features.

REFERENCE SIGNS LIST 1, 2, 3, 4, 5, 6 touch panel
11 driving circuit
12 detection circuit
13 drive line
14 reception line
15 reception line
21 transparent substrate
22 piezoelectric polymer layer
23 driving electrode
24 touch detection electrode
25 pressing force detection electrode
61 floating electrode
81 dummy electrode
82, 122 contact hole
121, 181 contact layer
123 bridge patterns
210, 220 liquid crystal display device
230 organic EL display device

The invention claimed is:

1. A touch panel comprising:
a driving circuit;
a detection circuit;
a drive line;
a first reception line;
a second reception line;
a piezoelectric polymer layer including a contact hole;
a driving electrode formed on a first main surface of the piezoelectric polymer layer and that is connected to the driving circuit via the drive line;
a pressing force detection electrode formed on a second main surface of the piezoelectric polymer layer and that is connected to the driving circuit via the drive line; and
a touch detection electrode formed on the first main surface of the piezoelectric polymer layer and on an inside of the contact hole and that is connected to the detection circuit via the first reception line; and
a dummy electrode that is formed at a position on the second main surface, which is opposed to the touch detection electrode, and that is not connected to the driving circuit, is not connected to the detection circuit, and is electrically connected to a portion of the touch detection electrode that is formed on the inside of the contact hole.

2. The touch panel according to claim 1, wherein the pressing force detection electrode is formed at a position overlapped with the driving electrode or the touch detection electrode.

3. The touch panel according to claim 1, wherein the driving electrode, the touch detection electrode, and the pressing force detection electrode have rhombus shapes.

4. The touch panel according to claim 1, wherein the driving electrode, the touch detection electrode, and the pressing force detection electrode have comb shapes.

5. A display device including the touch panel according to claim 1.

* * * * *